(12) United States Patent
Tabuchi et al.

(10) Patent No.: US 12,536,898 B2
(45) Date of Patent: Jan. 27, 2026

(54) INFORMATION PROCESSING APPARATUS, INFORMATION PROCESSING METHOD, AND NON-TRANSITORY COMPUTER READABLE STORAGE

(71) Applicant: PIONEER CORPORATION, Tokyo (JP)

(72) Inventors: Hiromasa Tabuchi, Tokyo (JP); Nobuaki Tanoue, Tokyo (JP); Kiyoshi Fueki, Tokyo (JP); Takeshi Nakagawa, Saitama (JP); Takeshi Nakamura, Saitama (JP); Hiromichi Arai, Saitama (JP); Takayuki Shintaku, Tokyo (JP)

(73) Assignee: Pioneer Corporation, Tokyo (JP)

( * ) Notice: Subject to any disclaimer, the term of this patent is extended or adjusted under 35 U.S.C. 154(b) by 69 days.

(21) Appl. No.: 18/281,248

(22) PCT Filed: May 31, 2021

(86) PCT No.: PCT/JP2021/020764
§ 371 (c)(1),
(2) Date: Sep. 8, 2023

(87) PCT Pub. No.: WO2022/254562
PCT Pub. Date: Dec. 8, 2022

(65) Prior Publication Data
US 2024/0177599 A1    May 30, 2024

(51) Int. Cl.
*G08G 1/00* (2006.01)
*G08G 1/01* (2006.01)
(Continued)

(52) U.S. Cl.
CPC ........... *G08G 1/0133* (2013.01); *G08G 1/052* (2013.01); *G01C 21/3492* (2013.01)

(58) Field of Classification Search
CPC ........ G08G 1/0133; G08G 1/052; G08G 1/00; G01C 21/3492; G01C 21/3697; G01C 21/3655; H04W 4/029; H04W 4/40
(Continued)

(56) References Cited

U.S. PATENT DOCUMENTS

2004/0162019 A1* 8/2004 Horita .................. G08G 1/0962
455/3.02
2007/0249367 A1 10/2007 Sato et al.

FOREIGN PATENT DOCUMENTS

JP 2001-091273 A 4/2001
JP 2002-365071 A 12/2002
(Continued)

OTHER PUBLICATIONS

Office Action issued in corresponding Japanese Patent Application No. 2023-525203, dated Oct. 1, 2024.
(Continued)

*Primary Examiner* — Shardul D Patel
(74) *Attorney, Agent, or Firm* — Foley & Lardner LLP

(57) ABSTRACT

An information processing apparatus includes a first acquisition unit that acquires movement information about a moving condition of a mobile object, a second acquisition unit that acquires area information corresponding to each of a plurality of pieces of content information and indicating a geographical range in which the content information is to be reproduced and output, a prediction unit that predicts the moving condition of the mobile object within the geographical range based on the movement information, a calculation unit that calculates priority of reproduction output for each of the plurality of pieces of content information based on a result of the prediction by the prediction unit, and a determination unit that determines an output order in reproducing and outputting the plurality of pieces of content information
(Continued)

in the mobile object, according to the priority calculated by the calculation unit.

11 Claims, 11 Drawing Sheets

(51) Int. Cl.
　　　*G08G 1/052*　　　(2006.01)
　　　*G01C 21/34*　　　(2006.01)
(58) Field of Classification Search
　　　USPC .......................................................... 701/118
　　　See application file for complete search history.

(56) References Cited

FOREIGN PATENT DOCUMENTS

| | | |
|---|---|---|
| JP | 2006-012081 A | 1/2006 |
| JP | 2007-292607 A | 11/2007 |
| JP | 2013-020457 A | 1/2013 |
| JP | 2013-221837 A | 10/2013 |
| JP | 2016-224318 A | 12/2016 |
| JP | 2017-181271 A | 10/2017 |
| JP | 2019-178945 A | 10/2019 |
| JP | 2020-165796 A | 10/2020 |
| WO | WO-2006/013844 A1 | 2/2006 |

OTHER PUBLICATIONS

Office Action, dated May 28, 2024, issued in corresponding Japanese Patent Application No. 2023-525203.
EP Supplementary European Search Report for Appl. No. 21944070.8 dated Mar. 5, 2025.

\* cited by examiner

FIG.4

| APPLICATION ID | CONTENT ID | CONTENT DATA | CATEGORY | META-INFORMATION | RANGE INFORMATION (AREA INFORMATION) |
|---|---|---|---|---|---|
| AP11 | C111 | DATA #111 | WARNING | META-INFORMATION #111 | RANGE INFORMATION #111 |
| AP12 | C121 | DATA #121 | CAUTION | META-INFORMATION #121 | RANGE INFORMATION #121 |
| ⋮ | ⋮ | ⋮ | ⋮ | ⋮ | ⋮ |
| AP21 | C211 | DATA #211 | GUIDANCE | META-INFORMATION #211 | RANGE INFORMATION #211 |
| AP22 | C221 | DATA #221 | ADVERTISEMENT | META-INFORMATION #221 | RANGE INFORMATION #221 |
| ⋮ | ⋮ | ⋮ | ⋮ | ⋮ | ⋮ |

FIG.5

| VEHICLE ID | NUMBER OF OCCUPANTS | TERMINAL ID | TIME | TRAVEL INFORMATION | ... |
|---|---|---|---|---|---|
| VE1 | NUMBER OF OCCUPANTS #1 | 10-1 | TM11 | TRAVEL INFORMATION #111 | ... |
| | | | TM12 | TRAVEL INFORMATION #112 | ... |
| | | | ... | ... | ... |
| VE2 | NUMBER OF OCCUPANTS #2 | 10-2 | TM11 | TRAVEL INFORMATION #211 | ... |
| | | | TM12 | TRAVEL INFORMATION #212 | ... |
| | | | ... | ... | ... |
| VE3 | NUMBER OF OCCUPANTS #3 | 10-3 | ... | ... | ... |
| ... | ... | ... | ... | ... | ... |

122

INFORMATION PROCESSING APPARATUS, INFORMATION PROCESSING METHOD, AND NON-TRANSITORY COMPUTER READABLE STORAGE

FIELD

The present invention relates to an information processing apparatus, an information processing method, and an information processing program.

BACKGROUND

There is known a conventional technology to output, as voice information, information such as warning information, route guidance information, road traffic information, tourist information, or advertisement information, to a driver driving a vehicle.

Incidentally, if these pieces of voice information are reproduced and output at the same time, it may be difficult to listen to these pieces of voice information, or these pieces of voice information may inhibit driving. Therefore, a mechanism has been proposed to schedule the timing of the reproduction output of these pieces of voice information for reproduction so that these pieces of voice information are reproduced and output without interference with each other.

CITATION LIST

Patent Literature

Patent Literature 1: JP 2013-221837 A

SUMMARY

Technical Problem

However, in an example, in the conventional technology described above, there is a problem that it sometimes cannot be said that the reproduction output of the content information can be optimized according to the change in travel condition by predicting the travel condition of the vehicle.

For example, in the conventional technology described above, when there is a possibility that reproduction of a plurality of pieces of voice information interferes with each other, a reproduction order according to a combination having a minimum degree of loss against non-reproduction and delayed reproduction is merely selected from combinations of the reproduction orders of these pieces of voice information.

Therefore, the conventional technology described above does not always make it possible to optimize the reproduction output of the content information according to the change in travel condition by predicting the travel condition of the vehicle.

The present invention has been made in view of the above, and an object of the present invention is to provide an information processing apparatus, an information processing method, and an information processing program that are configured to predict the travel condition of a vehicle to optimize reproduction output of content information according to the change in travel condition.

Solution to Problem

According to an aspect of the present disclosure, An information processing apparatus comprising: a first acquisition unit that acquires movement information about a moving condition of a mobile object; a second acquisition unit that acquires area information corresponding to each of a plurality of pieces of content information and indicating a geographical range in which the content information is to be reproduced and output; a prediction unit that predicts the moving condition of the mobile object within the geographical range based on the movement information; a calculation unit that calculates priority of reproduction output for each of the plurality of pieces of content information based on a result of the prediction by the prediction unit; and a determination unit that determines an output order in reproducing and outputting the plurality of pieces of content information in the mobile object, according to the priority calculated by the calculation unit.

According to an aspect of the present disclosure, An information processing method executed by an information processing apparatus, the method comprising: a first acquisition step of acquiring movement information about a moving condition of a mobile object; a second acquisition step of acquiring range information that is area information corresponding to each of a plurality of pieces of content information, the range information indicating a geographical range in which the content information is to be reproduced and output; a prediction step of predicting the moving condition of the mobile object within the geographical range based on the movement information; a calculation step of calculating priority of reproduction output for each of the plurality of pieces of content information based on a result of the prediction by the prediction step; and a determination step of determining an output order in reproducing and outputting the plurality of pieces of content information in the mobile object, according to the priority calculated by the calculation step.

According to an aspect of the present disclosure, An information processing program executed by an information processing apparatus including a computer, the information processing program causing the computer to function as: a first acquisition means that acquires movement information about a moving condition of a mobile object; a second acquisition means that acquires range information that is area information corresponding to each of a plurality of pieces of content information, the range information indicating a geographical range in which the content information is to be reproduced and output; a prediction means that predicts the moving condition of the mobile object within the geographical range based on the movement information; and a calculation means that calculates priority of reproduction output for each of the plurality of pieces of content information based on a result of the prediction by the prediction means; and a determination means that determines an output order in reproducing and outputting the plurality of pieces of content information in the mobile object, according to the priority calculated by the calculation means.

BRIEF DESCRIPTION OF DRAWINGS

FIG. 4 is a table illustrating an example of a content database according to an embodiment.

FIG. 5 is a table illustrating an example of a travel information database according to an embodiment.

DESCRIPTION OF EMBODIMENTS

Figure 1:
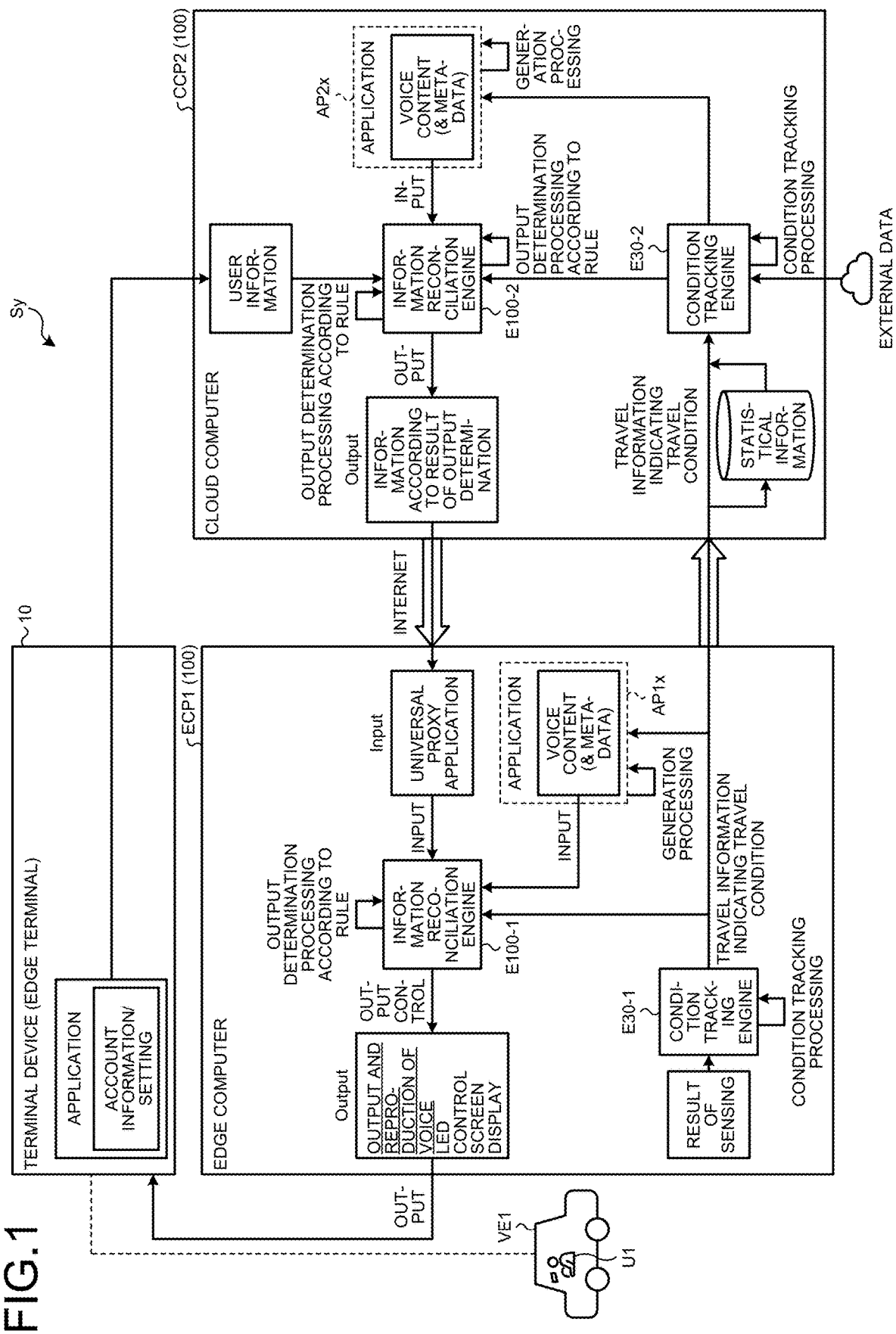
FIG. 1 is a diagram illustrating an example of a system according to an embodiment.

Hereinafter, modes for carrying out the present invention (hereinafter referred to as embodiments) will be described with reference to the drawings. Note that the present invention is not limited to the embodiments described below. Furthermore, in the drawings, the same portions are denoted by the same reference numerals.

In addition, in the following embodiments, it is assumed that a vehicle is also replaced with a mobile object, a travel condition is also replaced with a moving condition, and a traveling speed is also replaced with a moving speed. In addition, the expression "reproduced and output in the vehicle" includes the meaning of "reproduced and output on a terminal device that moves with the vehicle". In addition, the expression of output control for the vehicle to reproduce and output content information includes the meaning of output control for the terminal device and provision (output) of the content information to a user of the vehicle.

1. Introduction

Examples of the terminal device that moves with the vehicle include a terminal device (e.g., in-vehicle device) installed in the vehicle and a terminal device such as a smartphone owned by the user (e.g., an occupant of the vehicle including a driver), and applications that provide various content to such a terminal device is known.

For example, there is an application that assists driving of the user by providing content information having a content corresponding to a traveling state of the vehicle or a situation of the user driving the vehicle, or content information for route guidance according to various inputs (e.g., character input or voice input). In addition, there is also an application providing assistance for more comfortable driving by providing various content information such as tourist information, store guidance, advertisement information, or other useful information according to traveling of the vehicle.

Here, the application is sometimes classified into a specific type depending on what category of the content information can be provided. For example, an application about an advanced driver-assistance systems (ADAS) provides content information categorized into "warning" or "caution", and therefore, the application is classified into a type such as "ADAS" or "safety support". Meanwhile, applications about various guidance (e.g., route guidance, tourist information, etc.) provide content information categorized into "guidance", and therefore, the applications are classified into a type "guidance assistance". In addition, an application about store information (e.g., advertisement about a store) provides content information categorized into "advertisement", and therefore, the application is classified into a type such as "advertisement provision".

Furthermore, the application passes content information that the application desires to provide to the user, to an information reconciliation engine (specifically, a computer including the information reconciliation engine) which is described later, thereby reproducing and outputting the content information via the information reconciliation engine. At this time, the application adds, to the content information, meta-information that includes range information indicating a range for reproduction output, category information indicating a category of the content information, and a length (reproduction time) of the content information.

The range information indicating the range for reproduction output corresponds to condition information that specifies a geographical range, a time range, a travel distance range of the vehicle, a passing area range of the vehicle, a speed range of the vehicle, and the like, the content information being to be reproduced and output in the ranges. The condition information is conditioned to permit reproduction output of the content information within these ranges. In the following embodiments, a description will be given about the content information focusing on area information (an example of the range information) indicating the geographical range to be reproduced and output, but a range other than the geographical range, that is, the time range, travel distance range of the vehicle, passing area range of the vehicle, or speed range of the vehicle is applicable to the information processing according to the embodiments.

In addition, in a case where the geographical range is set for each application in this manner, part or all of the geographical ranges overlap between the applications in some cases. Then, a problem occurs that the reproduction output interferes between pieces of content information corresponding to the respective geographical ranges overlapping with each other. Furthermore, the content information is configured as a voice message and interference between the pieces of content information in reproduction output may inhibit driving, in consideration of the user to whom the content information is provided is the occupant of the vehicle. For this reason, the computer including the information reconciliation engine determines an appropriate output order and appropriate output timing, under the control of the information reconciliation engine. In addition, the computer predicts the travel condition in response to sequential change in the travel condition of the vehicle traveling, and prioritizes for optimization of the pieces of content information to be reproduced and output.

Furthermore, depending on the determined priority or output order, there is content information that is not reproduced or output and is rejected, in some cases. For this reason, some applications dynamically control (output setting) the ranges in which the content information thereof may be reproduced and output as efficiently as possible, but the computer including the information reconciliation engine is also configured to provide feedback according to performance information about reproduction output to the applications to support the output setting by the applications.

2. System

Next, a system including the above-described application and computer including the information reconciliation engine will be described with reference to FIG. 1. FIG. 1 is a diagram illustrating an example of the system according to an embodiment. FIG. 1 illustrates an information processing system Sy as an example of the system according to the embodiment. Information processing according to an embodiment which is described later is implemented by the information processing system Sy.

(Terminal Device 10)

A terminal device 10 (edge terminal) is an information processing terminal used by the user (the occupant of the vehicle). The terminal device 10 may be, for example, a stationary in-vehicle device installed in the vehicle, or may be a mobile terminal device (e.g., smartphone, tablet terminal, notebook PC, desktop PC, PDA, or the like) owned by the user. In the present embodiment, the terminal device 10 is the in-vehicle device.

Furthermore, in the example of FIG. 1, the terminal device 10 is provided in a vehicle VE1 driven by a user U1 to reproduce and output the content information according to output control by the computer including the information reconciliation engine. For example, the terminal device 10 includes a notification unit (output unit) to cause the notification unit to output the content information. For example, the notification unit may be a speaker or a display screen, and the terminal device 10 reproduces and outputs the content information (voice content) in voice message format via the speaker. Furthermore, the notification unit may be a display screen, and the terminal device 10 is configured to display information for supporting the contents of the voice content on the display screen.

Furthermore, various applications such as an ADAS application, navigation application, music application, delivery application, and an insurance application may be appropriately introduced into the terminal device 10 by the user, and these applications are configured to transmit, for example, user information including account information and setting information set by the user, to a cloud computer CCP2 which is described later.

Note that the application introduced into the terminal device 10 may be an application for an edge terminal corresponding to the application (hereinafter, may be referred to as "application according to the embodiment") that provides the content information in a voice message format together with the range information, or may be any application different from the application according to the embodiment.

(Edge Computer ECP1)

An edge computer ECP1 is a computer that performs data processing (edge processing) near the terminal device 10, and incorporates a condition tracking engine E30-1 and an information reconciliation engine E100-1. Furthermore, according to the example of FIG. 1, the edge computer ECP1 includes applications AP1x (e.g., application AP11, application AP12, application AP13, and . . . ) as the application according to the embodiment.

In the example of FIG. 1, the applications AP1x are provided inside the edge computer ECP1, but the applications AP1x may be independent of the edge computer ECP1. In such a configuration, for example, while the information processing system Sy may further include a server device (application server) supporting the applications AP1x, the edge computer ECP1 may not internally include the applications AP1x.

In addition, each of the applications AP1x is an application that provides more urgent content information to be output to the user, and therefore, the application AP1x is incorporated in the edge computer ECP1 near the terminal device 10. This configuration makes it possible to reproduce and output the content information provided from the application AP1x, with a shorter time lag in accordance with the travel condition of the vehicle VE1. For this reason, the application AP1x may be, for example, an application related to ADAS, and provides the content information categorized into "warning" or "caution".

Furthermore, as illustrated in FIG. 1, the edge computer ECP1 may further include a universal proxy application.

(Cloud Computer CCP2)

The cloud computer CCP2 is a computer that is on the cloud side and, for example, pushes various information, and incorporates a condition tracking engine E30-2 and an information reconciliation engine E100-2. Furthermore, according to the example of FIG. 1, the cloud computer CCP2 includes applications AP2x (e.g., application AP21, application AP22, and application AP23, and . . . ) as the application according to the embodiment.

In the example of FIG. 1, the applications AP2x are provided inside the cloud computer CCP2, but the applications AP2x may be independent of the cloud computer CCP2. In such a configuration, for example, while the information processing system Sy may further include a server device (application server) supporting the applications AP2x, the cloud computer CCP2 may not internally include the applications AP2x.

Furthermore, each of the applications AP2x may be an application that provides non-urgent content information to be output to the user. Therefore, the application AP2x is incorporated in the cloud computer CCP2 on the cloud side away from the terminal device 10. For this reason, the application AP2x may be, for example, an application related to the guidance assistance or advertisement provision, and provides the content information categorized into "guidance" or "advertisement".

(Specific Example of Information Processing)

Next a specific example of processing performed by each of the applications, the condition tracking engines, and the information reconciliation engines according to the embodiment will be described. In addition, hereinafter, the content information will be described as the voice content. Note that the content information is not limited to the voice content, and may be, for example, moving image content.

First, the specific example of processing performed by each application according to the embodiment will be described. Since the contents of the processing are the same in both the applications AP1x and AP2x, the application AP1x will be described here as an example.

The application AP1x personalizes the voice content provided for each user on the basis of a history of use by the user. Furthermore, the application AP1x performs processing of determining what kind of voice message should be used to respond, on the basis of the contents of speech indicated by the voice input by the user so as to achieve interaction with the user. Furthermore, the application AP1x is also configured to determine the voice content to be provided to the user or the contents of the voice message responding to the user, on the basis of the situation of the user.

In addition, the application AP1x performs generation processing of generating the voice content. For example, the application AP1x determines which voice content belonging to which category should be reproduced and output, on the basis of data received from the condition tracking engine E30-1 (for the application AP2x, the condition tracking engine E30-2), and generates the voice content having contents belonging to the determined category.

For example, the application AP1x generates the voice content having contents according to the travel condition of the vehicle tracked by the condition tracking engine E30-1. Note that the voice content generated by the generation processing may be, for example, basic text data of the voice message to be finally notified the user of, and may define the contents of the voice message obtained by being converted into the voice data later. In other words, the application AP1x may not only generate the voice data as the voice content, but also generate data in another basic format of the voice message, as the voice content.

In addition, the application AP1x is configured to also specify timing at which the voice content is reproduced and output. For example, the application AP1x is configured to generate the range information indicating a range in which the voice content is permitted to be reproduced and output, by using the geographical range, time range, travel distance range of the vehicle, passing area range of the vehicle, speed range of the vehicle, or the like in which the voice content is to be reproduced and output. Furthermore, in such a configuration, the application AP1x transmits the voice content to which the meta-information including the range information is added, to the information reconciliation engine E100-1 (for the application AP2x, the information reconciliation engine E100-2) and requests (reserves) the terminal device 10 to reproduce and output the voice content under a condition indicated by the range information.

Next, the specific example of processing by each condition tracking engine will be described. Since the contents of the processing are the same in both the condition tracking engines E30-1 and E30-2, the condition tracking engine E30-1 will be described as an example.

The condition tracking engine E30-1 performs condition tracking processing which is analytical processing for tracking the travel condition of the vehicle. For example, the condition tracking engine E30-1 senses the travel condition of the vehicle on the basis of sensor information obtained from various sensors. Note that the sensors here may be, for example, a sensor provided in the vehicle or a sensor included in the terminal device 10, and examples thereof include an acceleration sensor, a gyro sensor, a magnetic sensor, GPS, a camera, a microphone, and the like.

For example, the condition tracking engine E30-1 is configured to perform a series of analytical processing steps as follows. For example, the condition tracking engine E30-1 performs sensing on the basis of the sensor information acquired from the sensors described above, and performs base analysis by using a result of the sensing as a core element. In the base analysis, the condition tracking engine E30-1 extracts necessary data using the core element as an information source, and converts and processes the extracted data. Subsequently, the condition tracking engine E30-1 performs higher-order analysis using the converted and processed data. In the higher-order analysis, the condition tracking engine E30-1 analyzes a specific travel condition on the basis of the converted and processed data. For example, the condition tracking engine E30-1 analyzes whether the vehicle is traveling on a straight road, whether the vehicle is traveling along a curve, the traveling speed, a movement direction, a congestion situation, and the like, as the travel condition of the vehicle.

Note that, according to the example of FIG. 1, the condition tracking engine E30-2 may use statistical information obtained by statistical processing on travel condition log or user operation log, for the condition tracking processing.

Figure 2:
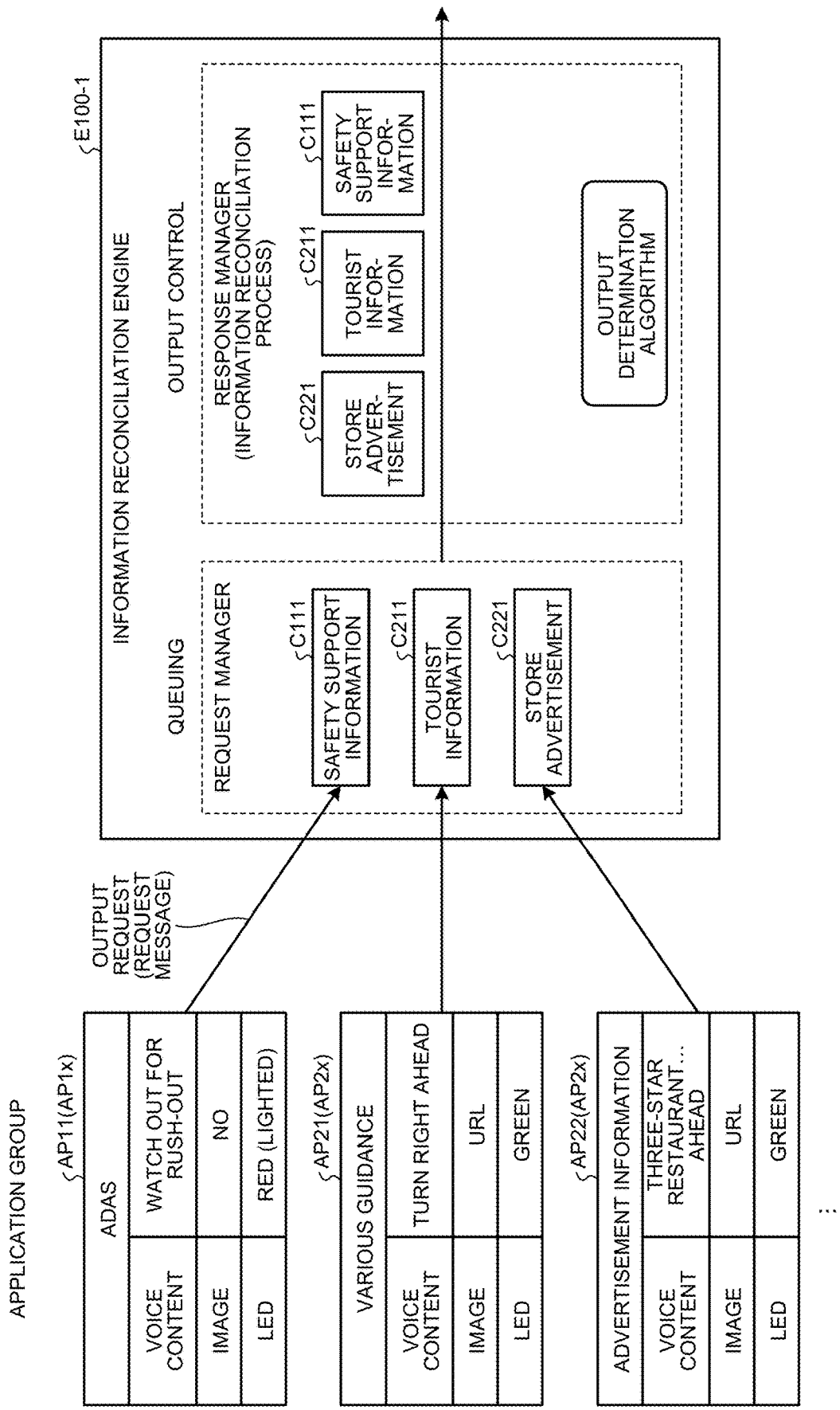
FIG. 2 is a diagram illustrating an example of an information reconciliation process.
Figure 3:
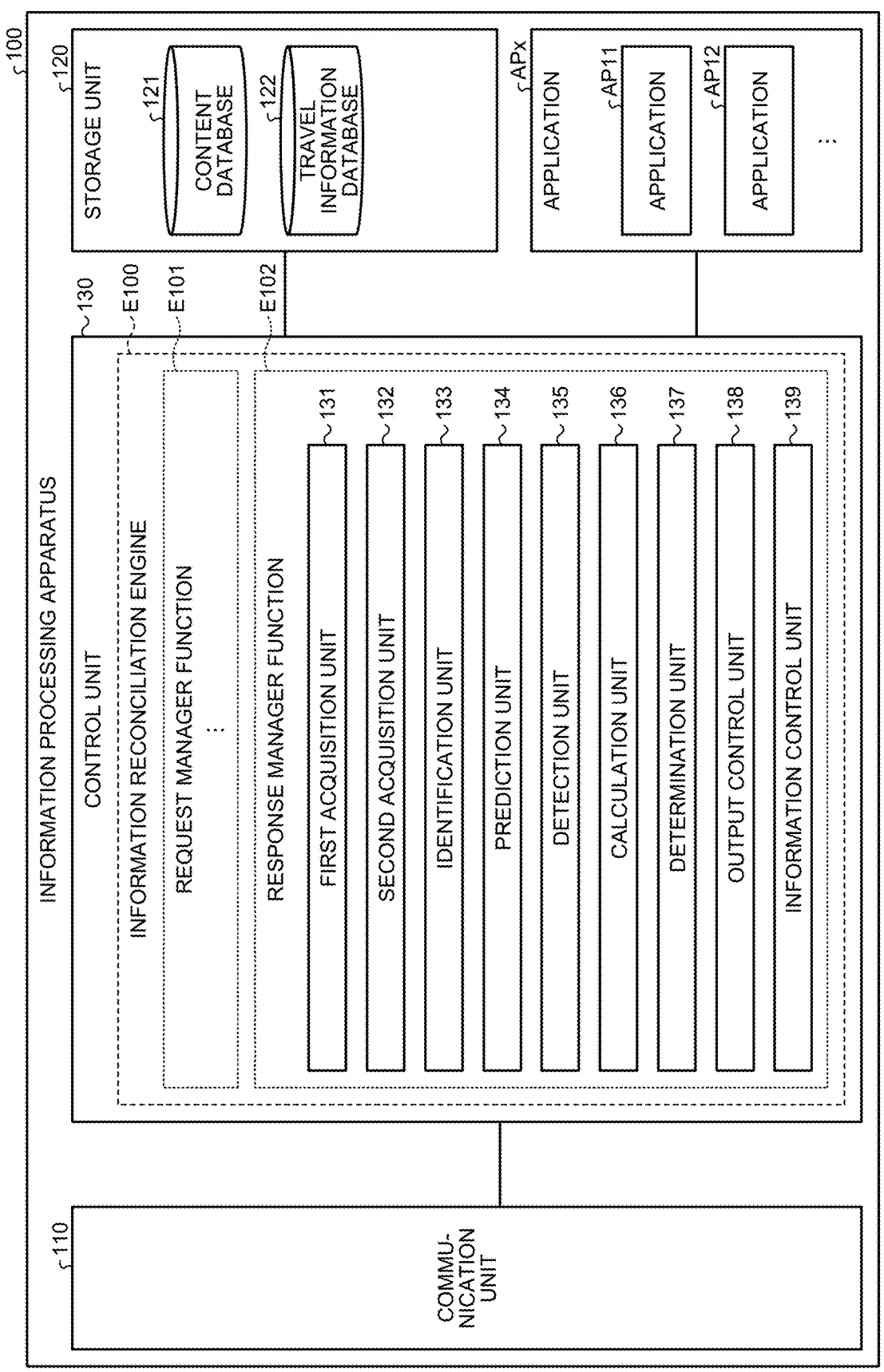
FIG. 3 is a diagram illustrating an exemplary configuration of an information processing apparatus according to an embodiment.

Next, the specific example of processing by each information reconciliation engine will be described. Since the contents of the processing are the same in both the information reconciliation engines E100-1 and E100-2, the information reconciliation engine E100-1 will be described as an example. As illustrated in FIGS. 2 and 3, the information reconciliation engine E100-1 has a request manager function and a response manager function.

The request manager function receives a request from the application AP1x (for the information reconciliation engine E100-2, the application AP2x) and performs queuing according to the received request. Note that the request here may be an output request for requesting reproduction and output of the generated voice content, and is transmitted while including, for example, the voice content. In addition, the request manager function queues the received voice content in a content buffer.

The response manager function performs output determination processing according to a rule. For example, the response manager function performs the output determination processing according to an output determination algorithm. More specifically, the response manager function determines the priority and output order indicating whether pieces of the voice content reserved for output should be actually output in what order, on the basis of the travel information indicating the travel condition tracked by the condition tracking engine E30-1 (for the information reconciliation engine E100-2, the condition tracking engine E30-2) and the range information included in the request. Then, the response manager function performs output control for the terminal device 10 to reproduce and output the pieces of voice content in the output order according to the determined priority.

3. Process of Information Processing

Next, a process of information processing (information processing according to an embodiment) implemented by the information processing system Sy will be described with reference to FIG. 1. Here, it is assumed the voice content is reproduced and output to the user U1 who drives the vehicle VE1 via the terminal device 10 corresponding to the in-vehicle device of the vehicle VE1. Here, the terminal device 10 transmits the sensor information detected by each sensor included in the terminal device 10 to the edge computer ECP1 as needed.

In such a state, first, an information flow starting from the side of the edge computer ECP1 will be described. When the sensor information transmitted from the terminal device 10 is acquired, the condition tracking engine E30-1 included in the edge computer ECP1 performs the condition tracking processing for tracking the traveling state of the vehicle VE1. For example, the condition tracking engine E30-1 performs a series of analytical processing steps such as sensing using the sensor information, base analysis using a result of the sensing as the core element, and higher-order analysis using data obtained as a result of the base analysis, for detailed condition tracking processing.

Then, the condition tracking engine E30-1 transmits the travel information indicating the travel condition tracked by the condition tracking processing to a destination where the travel information is used. For example, the condition tracking engine E30-1 transmits the travel information to the information reconciliation engine E100-1, the application AP1x, and the condition tracking engine E30-2. Note that the travel condition here may be, for example, the position, traveling speed, movement direction, and the like of the vehicle VE1.

When acquiring the travel information from the condition tracking engine E30-1, the application AP1x perform the generation processing of generating the voice content on the basis of the acquired travel information. For example, the application AP1x generates the voice content having contents according to the travel condition of the vehicle VE1 on the basis of the travel information acquired from the condition tracking engine E30-1. In addition, the application AP1x generates the range information indicating a range in which the voice content is permitted to be reproduced and output, by using the geographical range, time range, travel distance range of the vehicle VE1, passing area range of the vehicle VE1, speed range of the vehicle, or the like in which the voice content is to be reproduced and output, and adds the meta-information including the generated range information to the voice content. Then, the application AP1x inputs the voice content to which the meta-information is added, to the information reconciliation engine E100-1.

When acquiring the travel information from the condition tracking engine E30-1, the condition tracking engine E30-2 performs the condition tracking processing for tracking the traveling state of the vehicle VE1 on the basis of the acquired travel information. For example, the travel information acquired from the condition tracking engine E30-1 is accumulated in a predetermined database of the cloud computer CCP2. In addition, the user operation log may also be accumulated in this database, and the condition tracking engine E30-2 performs the statistical processing on the travel information and operation log having been accumulated, thereby performing the condition tracking processing for tracking the traveling state of the vehicle VE1 by using the statistical information indicating a result of the statistical processing and external data acquired from the outside.

Note that the external data here is data that can be acquired by only the computer located on the cloud, and is data useful for tracking the travel condition. Examples of the external data include weather information indicating a weather condition, traffic information indicating a traffic condition, and road information indicating a road condition. As a matter of course, the external data is not limited to this example.

Then, the condition tracking engine E30-2 transmits the travel information indicating the travel condition tracked by the condition tracking processing, to the destination where the travel information is used. For example, the condition tracking engine E30-2 transmits the travel information to the information reconciliation engine E100-2 and the application AP2x. Note that the travel condition here may be, for example, the position, traveling speed, movement direction, and the like of the vehicle VE1.

In addition, in response to performing the condition tracking processing between the condition tracking engine E30-1 and the condition tracking engine E30-2 and performing the generation processing between the application AP1x and the application AP2x, an information reconciliation process is performed from the information reconciliation engine E100-2 to the information reconciliation engine E100-1. For example, from the information reconciliation engine E100-2 to the information reconciliation engine E100-1, the information reconciliation process is performed to reconcile pieces of voice content, of pieces of output candidates voice content generated in the generation processing, having an optimal combination so as to be output in an optimum order.

For example, the area information (an example of the range information) indicating the geographical range to be reproduced and output is associated, as the meta-information, with each piece of voice content generated by the generation processing. Therefore, in the information reconciliation process, the priority of the reproduction output is calculated for each of a plurality of pieces of voice content, on the basis of the travel information indicating the travel condition traced by the condition tracking processing. Furthermore, in the information reconciliation process, the output order in a combination of pieces of voice content according to the priority is determined on the basis of the reproduction time, the area information, and the travel information of each of the plurality of pieces of voice contents. Then, output control is performed so that the pieces of voice content included in this combination is reproduced and output in order so as not to interfere with each other, according to the determined output order.

Furthermore, in some cases, the voice content is associated with area information indicating a geographical position or geographical range at which reproduction output is to be finished, as the meta-information. In such a case, in the information reconciliation process, output start timing at which the reproduction output is to be started may be determined, on the basis of the reproduction time of each of the plurality of pieces of voice content and the area information.

Hereinafter, an example of the information reconciliation process and output control processing according to a result of the information reconciliation process will be described with reference to the example of FIG. 1.

First, the information reconciliation engine E100-2 performs the output determination processing according to the area information (rule) that corresponds to each piece of voice content input from the application AP2x and that indicates the geographical range to be reproduced and output. For example, the response manager function of the information reconciliation engine E100-2 performs the output determination processing according to the output determination algorithm.

More specifically, the response manager function determines the priority and output order indicating whether pieces of the voice content reserved for output should be actually output in what order, in consideration of the travel information indicating the travel condition tracked by the condition tracking engine E30-2 and the reproduction time of each piece of voice content. For example, the response manager function determines the output order in the combination of pieces of voice content according to the priority. Note that, as illustrated in FIG. 1, the response manager function may perform the output determination processing by further using the user information transmitted from an application introduced into the terminal device 10.

Then, the information reconciliation engine E100-2 outputs the information determined by the response manager function, to the edge computer ECP1, as information according to a result of the output determination. The information output to the edge computer ECP1 is input to the information reconciliation engine E100-1 via the universal proxy application of the edge computer ECP1.

The information reconciliation engine E100-1 performs the output determination processing, according to the area information (rule) corresponding to each of the pieces of voice content input from the application AP1x and pieces of voice content indicated by the combination input from the information reconciliation engine E100-2 as the result of the output determination. For example, the response manager function of the information reconciliation engine E100-1 performs the output determination processing according to the output determination algorithm.

More specifically, the response manager function determines the final priority and output order indicating whether pieces of the voice content reserved for output should be actually output in what order, in consideration of the travel information indicating the travel condition tracked by the condition tracking engine E30-1, the reproduction time of each piece of voice content, and information (priority and output order) determined by the information reconciliation engine E100-2. For example, the response manager function determines the output order in the combination of pieces of voice content according to the priority.

Then, the information reconciliation engine E100-2 performs output control for the terminal device 10 to reproduce and output the pieces of voice content in the output order according to the determined priority. Under the output control, the terminal device 10 sequentially reproduces and outputs the pieces of voice content included in the combination according to the priority so that the pieces of voice content do not interfere with each other.

Note that, according to the example of FIG. 1, the information reconciliation engine E100-2 is also operable to perform LED control on the terminal device 10 to luminescence LED according to the category in order to cause the user to recognize, for example, what category the voice content currently reproduced and output belongs to. Furthermore, according to the example of FIG. 1, the information reconciliation engine E100-2 is also operable to perform display control on the terminal device 10 to display information for supporting the content of the voice content on the display screen.

4. Specific Example of Information Reconciliation Process

Next, a specific example of the information reconciliation process performed by the information reconciliation engine will be described in more detail. FIG. 2 is a diagram illustrating an example of the information reconciliation process. FIG. 2 illustrates the information reconciliation process performed by the information reconciliation engine E100-1.

FIG. 2 illustrates an example in which the application AP11 as the application related to ADAS in the edge computer ECP1 generates voice content C111 (safety support information C111) with a message content "watch out for rush-out", transmits an output request for requesting reproduction output of the generated voice content C111 to the information reconciliation engine E100-1, and reserves (requests) the reproduction output.

In addition, FIG. 2 illustrates an example in which the application AP21 as the application related to the guidance assistance in the cloud computer CCP2 generates voice content C211 (tourist information C211) with a message content "turn right ahead", transmits an output request for requesting reproduction output of the generated voice content C211 to the information reconciliation engine E100-1, and reserves (requests) the reproduction output.

In addition, FIG. 2 illustrates an example in which the application AP22 as the application related to advertisement provision in the cloud computer CCP2, generates voice content C221 (store advertisement C221) with a message content of "three-star restaurant . . . ahead", transmits an output request for requesting reproduction output of the generated voice content C221 to the information reconciliation engine E100-1, and reserves (requests) the reproduction output.

In addition, in the example of FIG. 2, the request manager function of the information reconciliation engine E100-1 performs queuing according to the output request received from each of the applications AP11, AP21, and AP22. For example, the request manager function performs queuing of the voice content C111, C211, and C221 received together with the output requests, in the content buffer.

In addition, the response manager function of the information reconciliation engine E100-1 performs the output determination processing according to the rule. For example, the response manager function performs the output determination processing according to an output determination algorithm. More specifically, the response manager function determines the priority and output order indicating which pieces of the voice content should be output in what order, on the basis of the travel information indicating the travel condition tracked by the condition tracking engine E30-1, the area information included in the output requests, and the reproduction time of the pieces of voice content reserved for output. Then, the response manager function determines the output order for the combination of the pieces of voice content according to the determined priority. In addition, the response manager function performs output control for the terminal device 10 to reproduce and output the pieces of voice content corresponding to the combination, in the determined output order.

5. Information Processing Apparatus According to Embodiment

FIG. 1 illustrates the example in which information processing according to the embodiment is performed between the edge computer ECP1 and the cloud computer CCP2. Hereinafter, a computer including the information reconciliation engine E100-1 or information reconciliation engine E100-2 will be described as an information processing apparatus 100 according to the embodiment.

The information processing apparatus 100 may be a server apparatus corresponding to the edge computer ECP1 or a server apparatus corresponding to the cloud computer CCP2. Furthermore, the information processing apparatus 100 may be one server apparatus having integrated functions of the edge computer ECP1 and cloud computer CCP2.

For example, the information processing apparatus 100 calculates, for each of the plurality of pieces of content information, the priority of the reproduction output by using the area information that corresponds to each of the plurality of pieces of content information and that indicates the geographical range in which each piece of content information is to be reproduced and output, the reproduction time of each of the plurality of pieces of content information, and further the travel information about the travel condition of the vehicle. Then, the information processing apparatus 100 determines the output order in reproducing and outputting the plurality of pieces of content information in the vehicle, according to the calculated priority.

Note that the information processing apparatus 100 may also provide feedback to the application on the basis of the performance information about reproduction output of the content information.

6. Configuration of Information Processing Apparatus

First, the information processing apparatus 100 will be described in more detail with reference to FIG. 3. FIG. 3 is a diagram illustrating an exemplary configuration of the information processing apparatus 100 according to an embodiment. As illustrated in FIG. 3, the information processing apparatus 100 includes a communication unit 110, a storage unit 120, an application APx, and a control unit 130.
(Communication Unit 110)

The communication unit 110 is implemented by, for example, NIC or the like. Then, the communication unit 110 is connected to a network in a wired or wireless manner, and transmits and receives information to and from, for example, the terminal device 10.

(Storage Unit 120)

The storage unit 120 is implemented by a semiconductor memory element such as a random access memory (RAN) or a flash memory, or a storage device such as a hard disk or an optical disk. The storage unit 120 includes a content database 121 (content buffer) and a travel information database 122.

(Content Database 121)

The content database 121 stores various information about content information. Here, FIG. 4 illustrates an example of the content database 121 according to an embodiment. In the example of FIG. 4, the content database 121 includes items such as "application ID", "content ID", "content data", "category", "meta-information", and "range information".

The "application ID" indicates identification information identifying an application (an application capable of providing the content information) according to the embodiment. The "content ID" indicates identification information identifying content information (voice content) generated by an application indicated by the "application ID".

The "content data" is content information generated by the application indicated by the "application ID". The "category" indicates a category to which the content information generated by the application indicated by the "application ID" belongs. The "category" includes warning, caution, guidance, advertisement, entertainment, and the like.

The "meta-information" including the range information indicating a range for reproduction output of the content information, the category information indicating the category of the content information, the length (reproduction time) of the content information, and the like is added to the content information.

The "range information" corresponds to the condition information that conditions the range (an allowable range allowing the reproduction output of the content information) for reproduction output of the content information. For example, an example of the "range information" includes the area information indicating the geographical range in which the content information is to be reproduced and output. In addition, the "range information" includes the time range in which the content information is to be reproduced and output, the travel distance range of the vehicle, the passing area range of the vehicle, the speed range of the vehicle, and the like. Note that the "range information" may be set by the application according to the embodiment.

In other words, FIG. 4 illustrates the example in which an application (application AP11) identified by an application ID "AP11" generates content information that is content information (content information C111) identified by a content ID "C111" and that includes data #111.

In addition, FIG. 4 illustrates the example in which the content information C111 is classified into a category "warning" on the basis of a content indicated by the data #111.

In addition, FIG. 4 illustrates the example in which meta-information #111 is added to the content information C111, and the meta-information #111 includes the area information indicating that the geographical range in which the content information C111 is to be reproduced and output is a geographical range #111.

Note that, in the example of FIG. 4, a conceptual symbol such as "#111" is used to simplify the description, but in practice, valid information corresponding to each item is input.

(Travel Information Database 122)

The travel information database 122 stores the travel information about the travel condition of the vehicle. Here, FIG. 5 illustrates an example of the travel information database 122 according to an embodiment. In the example of FIG. 5, the travel information database 122 includes items such as "vehicle ID", "number of occupants", "terminal ID", "time", and "travel information".

The "vehicle ID" indicates identification information identifying a vehicle. The "number of occupants" indicates the number of occupants in the vehicle identified by the "vehicle ID".

The "terminal ID" indicates identification information identifying the terminal device 10 (in-vehicle device) installed in the vehicle identified by the "vehicle ID".

The "time" indicates a date and time when the "travel information" is acquired. The "travel information" is a travel condition of the vehicle identified by the "vehicle ID", and indicates the travel condition at the date and time indicated by the "time". In addition, the travel condition indicates, for example, whether the vehicle is traveling on a straight road, whether the vehicle is traveling along a curve, the traveling speed, traveling position, movement direction, and congestion situation.

(Application APx)

Returning to FIG. 3, the application APx corresponds to the application AP1x or AP2x according to the embodiment illustrated in FIG. 1.

(Control Unit 130)

The control unit 130 is implemented by executing various programs (e.g., information processing program according to the embodiment) stored in a storage device inside the information processing apparatus 100 by a central processing unit (CPU), a micro processing unit (MPU), or the like, using RAM as a working area. Furthermore, the control unit 130 is implemented by, for example, an integrated circuit such as an application specific integrated circuit (ASIC) or a field programmable gate array (FPGA).

As illustrated in FIG. 3, the control unit 130 includes an information reconciliation engine E100. The information reconciliation engine E100 corresponds to the information reconciliation engine E100-1 or E100-2 illustrated in FIG. 1. The information reconciliation engine E100 includes a request manager function E101 and a response manager function E102.

Note that, although not illustrated in FIG. 3, the request manager function E101 may include a request reception unit and a queuing unit. Furthermore, as illustrated in FIG. 3, the response manager function E102 includes a first acquisition unit 131, a second acquisition unit 132, an identification unit 133, a prediction unit 134, a detection unit 135, a calculation unit 136, a determination unit 137, an output control unit 138, and an information control unit 139.

(First Acquisition Unit 131)

The first acquisition unit 131 acquires the travel information about the travel condition of the vehicle. For example, the first acquisition unit 131 acquires the travel information indicating the travel condition of the vehicle tracked by the condition tracking processing by the condition tracking engine E30-1 (E30-2).

(Second Acquisition Unit 132)

The second acquisition unit 132 acquires the area information that corresponds to each of the plurality of pieces of content information and that indicates the geographical range in which the content information is to be reproduced and output. For example, the second acquisition unit 132 acquires the area information indicating the geographical range in which the content information having a time width (reproduction time) is to be reproduced and output from beginning to end. For example, the area information being included in the meta-information is transmitted by the application APx together with the content information. Therefore, the second acquisition unit 132 is configured to also acquire the area information by acquiring the content information input by the application APx.

(Identification Unit 133)

The identification unit 133 identifies a recipient vehicle to which the content information is distributed, on the basis of the travel information about the travel condition of the vehicle. Note that the recipient vehicle to which the content information is distributed represents the terminal device 10 as the distribution destination to which the content information is distributed. The travel information here may be the travel information acquired by the first acquisition unit 131.

Furthermore, the identification unit 133 may identify the recipient vehicle, from among vehicles traveling on a target road, on the basis of the travel information of each vehicle traveling on the target road, or may identify the recipient vehicle, on the basis of the statistical information (statistical travel condition) obtained from the travel information corresponding to each vehicle that has traveled on the target road in the past.

For example, the identification unit 133 extracts a vehicle traveling in a direction toward a target point (e.g., a facility to be advertised indicated by the content information) according to the content information, on the basis of the travel information, and identifies the extracted vehicle as the recipient vehicle. In this point, for example, the identification unit 133 is configured to identify a vehicle predicted to reach the geographical range indicated by the area information in the future, on the basis of the travel information, and extract the identified vehicle as the vehicle traveling in the direction toward the target point.

Furthermore, for example, the identification unit 133 may extract a vehicle traveling in a lane on a side on which the target point according to the content information is located, on the basis of the travel information, and identify the extracted vehicle as the recipient vehicle.

(Prediction Unit 134)

The prediction unit 134 predicts the travel condition of the vehicle within the geographical range on the basis of the travel information. For example, the prediction unit 134 repeats with a lapse of time prediction of the travel condition of the vehicle within the geographical range, which is the moving condition at predetermined timing in the future, and updates a result of the prediction.

The travel information may include direction information indicating the movement direction of the vehicle, and the prediction unit 134 repeats the prediction of the movement direction of the vehicle at predetermined timing with the lapse of time on the basis of the direction information, and updates a result of the prediction of the movement direction.

In addition, the travel information may include lane information indicating a driving lane of the vehicle, and the prediction unit 134 repeats prediction of the driving lane of the vehicle at predetermined timing with the lapse of time on the basis of the lane information, and updates a result of the prediction of the driving lane.

In addition, the travel information may include speed information about the speed of the vehicle, and the prediction unit 134 repeats position prediction of the vehicle at predetermined timing with the lapse of time on the basis of the speed information, and updates a result of the prediction of the position.

In addition, the travel information may include congestion information about the vehicle, and the prediction unit 134 repeats position prediction of the vehicle at predetermined timing with the lapse of time on the basis of the congestion information, and updates a result of the prediction of the position.

Furthermore, the travel information may include speed information about the speed of the vehicle within the geographical range, and the prediction unit 134 predicts the traveling speed of the vehicle at predetermined timing as the moving condition, on the basis of the speed information. Furthermore, for example, the prediction unit 134 may predict the traveling speed of the vehicle at predetermined timing, on the basis of the congestion information.

(Detection Unit 135)

The detection unit 135 detects overlapping of areas between the geographical ranges indicated by the respective pieces of area information acquired by the second acquisition unit. For example, the detection unit 135 compares the geographical ranges indicated by the respective pieces of area information to detect which areas overlap how far.

(Calculation Unit 136)

The calculation unit 136 calculates the priority of reproduction output for each of the plurality of pieces of content information, on the basis of a result of the prediction by the prediction unit 134.

For example, the calculation unit 136 calculates the priority of the reproduction output for each of the plurality of pieces of content information on the basis of the latest result of the prediction of the results of the predictions predicted with the lapse of time.

For example, in a state where the prediction of the movement direction is repeated with the lapse of time, with the result of the prediction updated, the calculation unit 136 calculates the priority of the reproduction output for each of the plurality of pieces of content information, on the basis of the latest movement direction. Furthermore, for example, in a situation where the prediction of the driving lane is repeated with the lapse of time, with the result of the prediction updated, the calculation unit 136 calculates the priority of the reproduction output for each of the plurality of pieces of content information, on the basis of the latest driving lane.

Furthermore, for example, in a situation where the prediction of the traveling position is repeated with the lapse of time, with the result of the prediction updated, the calculation unit 136 calculates the priority of the reproduction output for each of the plurality of pieces of content information, on the basis of the latest traveling position. Furthermore, for example, in a situation where the prediction of the traveling speed is repeated with the lapse of time, with the result of the prediction is updated, the calculation unit 136 calculates the priority of the reproduction output for each of the plurality of pieces of content information, on the basis of the latest traveling speed.

Note that the calculation unit 136 is configured to calculate a higher priority, for the content information more relevant to the result of the prediction by the prediction unit 134 of the plurality of pieces of content information. For example, it is assumed that the prediction unit 134 predicts that the vehicle will turn right at predetermined timing. In such a case, the calculation unit 136 is configured to calculate a higher priority for the content information advertising a store located around the right corner.

(Determination Unit 137)

The determination unit 137 determines the output order in reproducing and outputting the plurality of pieces of content information in the vehicle.

In one aspect, the determination unit 137 determines the output order in reproducing and outputting the plurality of pieces of content information in the vehicle, on the basis of the reproduction time of each of the plurality of pieces of content information and the area information. For example, the determination unit 137 determines an output order to sequentially reproduce and output the plurality of pieces of content information without causing interference with each other at the predetermined timing, on the basis of the travel condition of the vehicle within the geographical range at predetermined timing in the future.

For example, when overlapping of the areas is detected by the detection unit 135, the determination unit 137 determines the output order to sequentially reproduce and output the plurality of pieces of content information without causing interference with each other at the predetermined timing, on the basis of an overlapping relationship detected and the reproduction time of each piece of content information corresponding to the geographical range including the overlapping.

For example, when overlapping of the areas is detected by the detection unit 135, the determination unit 137 further uses travel information about the travel conditions of vehicles located within the geographical range including the detected overlapping to determine the output order. For example, when the overlapping of the areas is detected by the detection unit 135, the determination unit 137 calculates a distance through which the vehicle travels according to the reproduction time of the content information, on the basis of the traveling speed of the vehicle within the geographical range including the detected overlapping at the predetermined timing predicted from the speed information, and the reproduction time of each piece of content information corresponding to the geographical range, and the determination unit 137 determines the output order on the basis of the calculated distance and the overlapping relationship. Furthermore, for example, when the overlapping of the areas is detected by the detection unit 135, the determination unit 137 calculates a distance through which the vehicle travels according to the reproduction time of the content information, on the basis of the traveling speed of the vehicle within the geographical range including the detected overlapping at the predetermined timing predicted from the congestion information, and the reproduction time of each piece of content information corresponding to the geographical range, and the determination unit 137 determines the output order on the basis of the calculated distance and the overlapping relationship.

More specifically, on the basis of the distance and the relationship, the determination unit 137 extracts, from among the plurality of pieces of content information, a combination of a plurality of pieces of content information in which the plurality of pieces of content information is allowed to be sequentially reproduced and output so as not to interfere with each other at predetermined timing, and the determination unit 137 determines the output order for the extracted combination. For example, the determination unit 137 further uses the priority calculated from the meta-information added to each of the plurality of pieces of content information to extract a combination of pieces of content information from the plurality of pieces of content information, and determines the output order for the extracted combination, according to the priority.

In another aspect, the determination unit 137 determines the output order in reproducing and outputting the plurality of pieces of content information in the vehicle, on the basis of the travel information and the area information. For example, the determination unit 137 uses the result of the prediction performed by the prediction unit 134 on the basis of the travel information, and determines the output order to sequentially reproduce and output the plurality of pieces of content information without causing interference with each other at predetermined timing. For example, the determination unit 137 uses the result of the prediction performed by the prediction unit 134 on the basis of the travel information, and determines the output order to sequentially reproduce and output the plurality of pieces of content information without causing interference with each other at predetermined timing.

Then, when the overlapping of the areas is detected by the detection unit 135, the determination unit 137 determines the output order on the basis of the detected overlapping relationship and the moving speed predicted by the prediction unit. For example, when the overlapping of the areas is detected by the detection unit 135, the determination unit 137 determines the output order, on the basis of the traveling speed of the vehicle within the geographical range including the detected overlapping, from among the traveling speeds predicted by the prediction unit 134, and the overlapping relationship.

More specifically, when the overlapping of the areas is detected by the detection unit 135, the determination unit 137 calculates a distance through which the vehicle travels according to the reproduction time of the content information, on the basis of the traveling speed within the geographical range including the overlapping and the reproduction time of each piece of content information corresponding to the geographical range, and determines the output order on the basis of the calculated distance and the overlapping relationship.

In an example, on the basis of the distance and the relationship, the determination unit 137 extracts, from among the plurality of pieces of content information, a combination of a plurality of pieces of content information in which the plurality of pieces of content information is allowed to be sequentially reproduced and output so as not to interfere with each other at predetermined timing, and the determination unit 137 determines the output order for the extracted combination. For example, the determination unit 137 further uses the priority calculated from the meta-information added to each of the plurality of pieces of content information to extract a combination of pieces of content information from the plurality of pieces of content information, and determines the output order for the extracted combination, according to the priority.

Furthermore, in still another aspect, the determination unit 137 determines the output order in reproducing and outputting the plurality of pieces of content information in the vehicle, according to the priority calculated by the calculation unit 136. For example, the determination unit 137 determines the output order to sequentially reproduce and output the plurality of pieces of content information without causing interference with each other at predetermined timing, according to the priority.

(Output Control Unit 138)

The output control unit 138 performs output control so that output target content information is reproduced and output in the vehicle, according to the priority and output order determined by the determination unit 137. For example, the output control unit 138 performs output control for the terminal device 10 to reproduce and output the output target content information in the output order according to the priority determined by the determination unit 137. For example, the output control unit 138 distributes the output target content information to the recipient vehicle (specifically, the terminal device 10 provided in the recipient vehicle or the terminal device 10 owned by the user of the recipient vehicle).

(Information Control Unit 139)

When extraction of the combination of a plurality of pieces of content information in which the plurality of pieces of content information is allowed to be sequentially reproduced and output so as not to interfere with each other excludes content information from the combination, the information control unit 139 estimates whether there is room for leaving a margin area within the geographical range corresponding to the excluded content information even at the end of the reproduction output of the content information included in the combination, and when it is estimated that there is room for the margin area, the information control unit 139 acquires content information controlled within the reproduction time according to the margin area, as additional content information to be reproduced and output in the margin area.

7. Specific Example of Information Processing According to Embodiment

Figure 6:
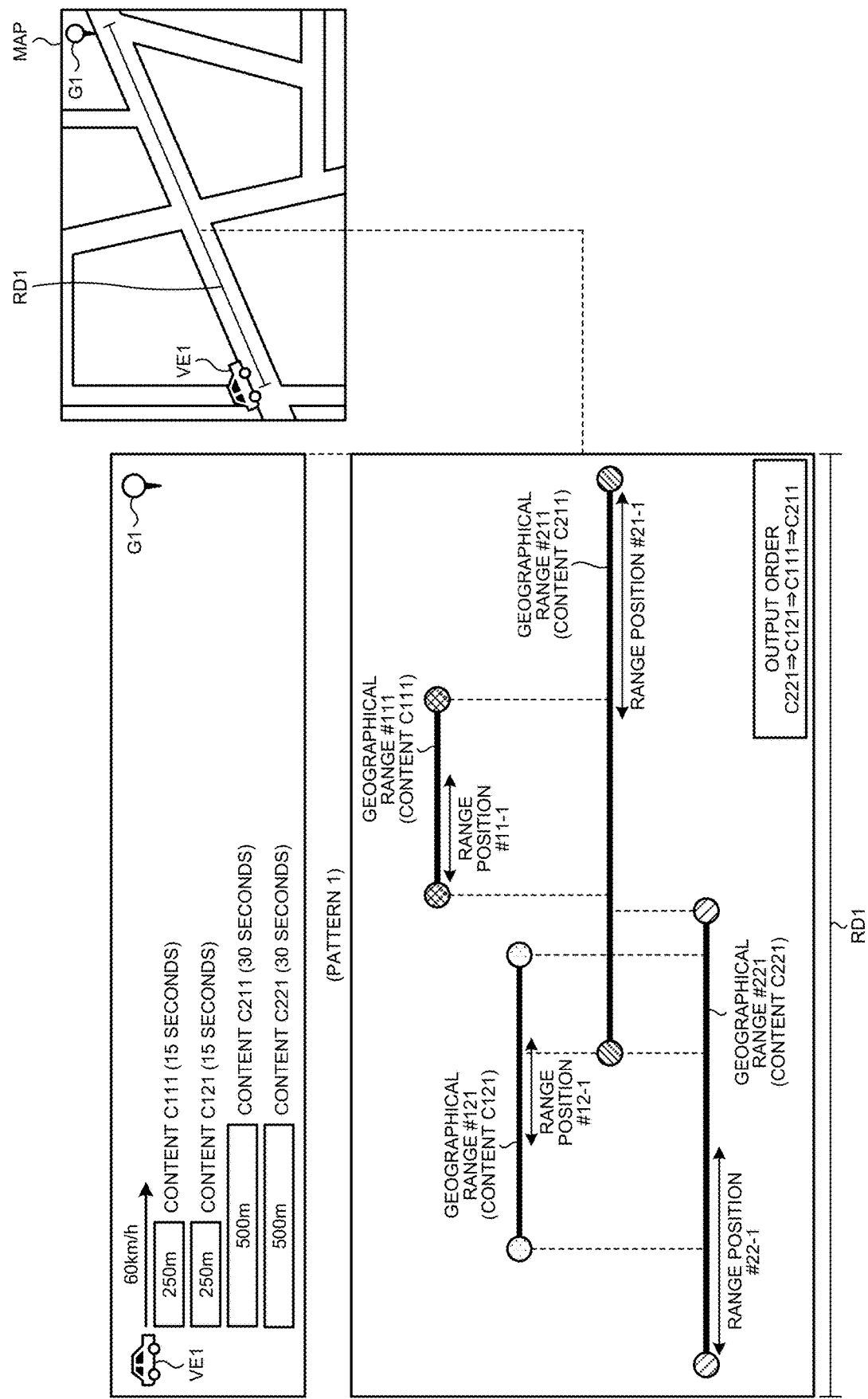
FIG. 6 is a diagram illustrating an example of information processing according to an embodiment.
Figure 7:
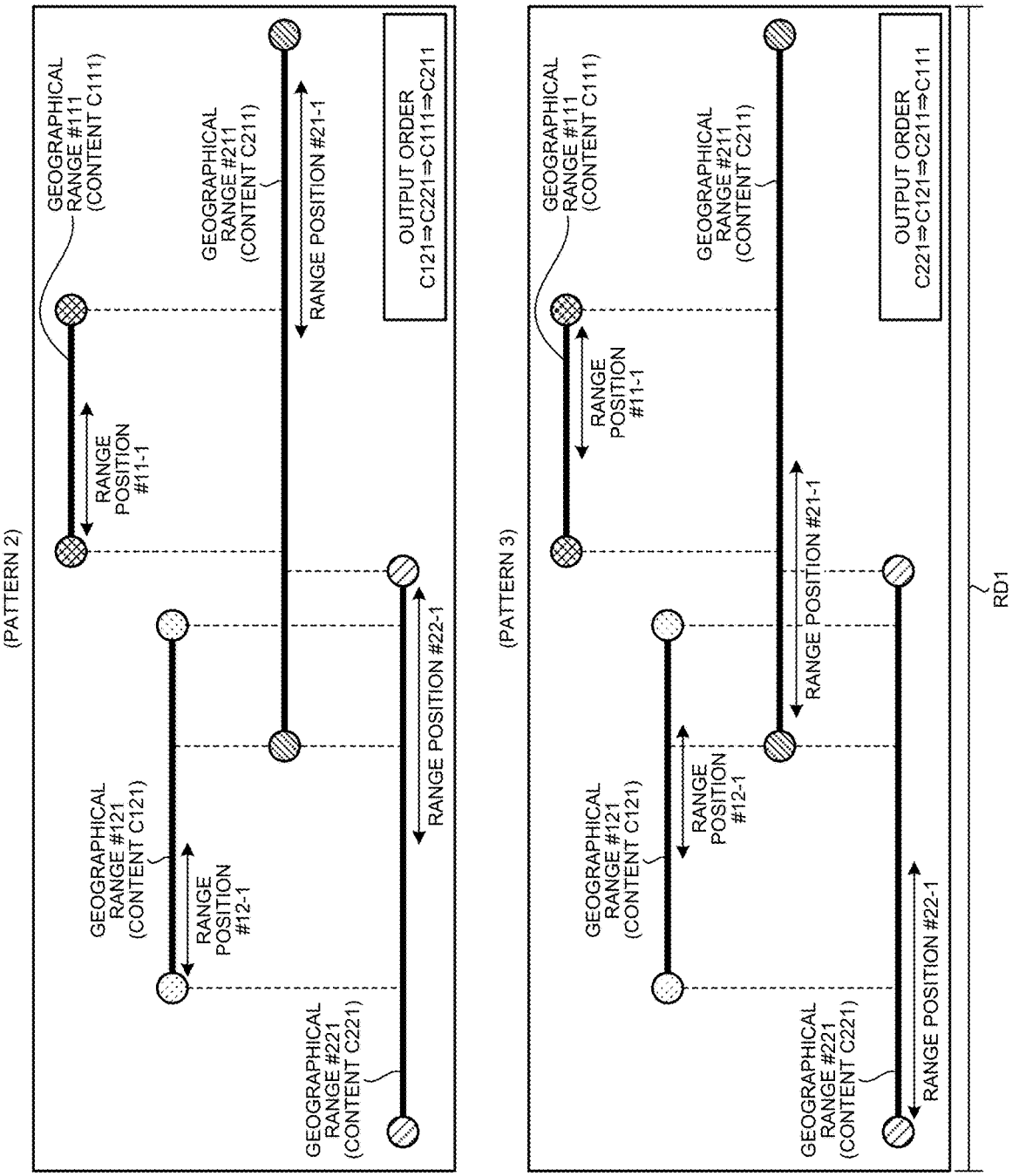
FIG. 7 is a diagram illustrating another example of the information processing according to an embodiment.

Hereinafter, a specific example of information processing (determination processing) according to an embodiment will be described with reference to FIGS. 6 and 7. FIG. 6 is a diagram illustrating an example of the information processing according to an embodiment. FIG. 7 is a diagram illustrating another example of the information processing according to an embodiment. In FIG. 6, information processing (pattern 1) according to the embodiment will be described. In FIG. 7, information processing (patterns 2 and 3) according to the embodiment will be described.

In addition, FIGS. 6 and 7 illustrate the determination processing of determining the output order in reproducing and outputting content information C111, C121, C211, and C221. for the vehicle VE1 (from MAP in FIG. 6) traveling on a road RD1 toward a target point Gi.

In addition, according to the examples of FIGS. 6 and 7, the vehicle VE1 is traveling at 60 km/h on the road RD1, the geographical range is set on the road RD1, and the content information C111, C121, C211, and C221 is output candidate content information.

In addition, according to the examples of FIGS. 6 and 7, the content information C111 has a reproduction time of 15 seconds, and the geographical range #111 on the road RD1 is added as the meta-information. In other words, the geographical range #111 in which the content information C111 is to be reproduced and output is located on the road RD1. Furthermore, the content information C121 has a reproduction time of 15 seconds, and a geographical range #121 on the road RD1 is added as the meta-information. In other words, the geographical range #121 in which the content information C121 is to be reproduced and output is located on the road RD1.

Furthermore, the content information C211 has a reproduction time of 30 seconds, and a geographical range #211 on the road RD1 is added as the meta-information. In other words, the geographical range #211 in which the content information C211 is to be reproduced and output is located on the road RD1. Furthermore, the content information C221 has a reproduction time of 30 seconds, and a geographical range #221 on the road RD1 is added as the meta-information. In other words, the geographical range #221 in which the content information C221 is to be reproduced and output is located on the road RD1.

Here, the pattern 1 shows an example in which the output order to sequentially reproduce and output the content information C111, C121, C211, and C221 without causing interference with each other is determined, on the basis of a distance through which the vehicle VE1 travels according to the reproduction time of each piece of content information and a relationship in overlapping of areas between the geographical ranges, without consideration of the priority between the content information C111, C121, C211, and C221.

The content information C111 has a reproduction time of "15 seconds", and therefore, a distance through which the vehicle VE1 travels at "60 km/h" during this period is "250 m". In addition, the content information C121 has a reproduction time of "15 seconds", and therefore, a distance through which the vehicle VE1 travels at "60 km/h" during this period is "250 m".

In addition, the content information C211 has a reproduction time of "30 seconds", and therefore, a distance through which the vehicle VE1 travels at "60 km/h" during this period is "500 m". In addition, the content information C221 has a reproduction time of "30 seconds", and therefore, a distance through which the vehicle VE1 travels at "60 km/h" during this period is "500 m".

Furthermore, according to the example of FIG. 6, the detection unit 135 compares the geographical ranges #111, #121, #211, and #221 with each other to detect overlapping of areas. As a result, the detection unit 135 detects four overlaps of the geographical ranges #121-#221, the geographical ranges #121-#211-#221, the geographical ranges #211-#221, and the geographical ranges #111-#211, as indicated by dotted lines in FIG. 6.

In such a state, assuming that the content information C111 is reproduced and output within the geographical range #111, the content information C121 is reproduced and output within the geographical range #121, the content information C211 is reproduced and output within the geographical range #211, and the content information C221 is reproduced and output within the geographical range #221, according to the travel condition of the vehicle VE1, the determination unit 137 determines the output order to sequentially reproduce and output the respective pieces of content information without causing interference with each other, on the basis of the distance and the overlapping relationship.

Therefore, according to the example of the pattern 1 in FIG. 6, the determination unit 137 is configured to determine the output order of the content information C221 (first) →C121 (second)→C111 (third)→C211 (fourth).

Furthermore, the determination unit 137 is configured to determine in which range of the corresponding geographical range each of the pieces of content information C111, C121, C211, and C221 should be actually reproduced and output.

Specifically, the determination unit 137 determines a range position indicating in which range of the geographical range #111 the content information C111 should be actually reproduced and output. According to the example of the pattern 1 in FIG. 6, the determination unit 137 is configured to determine a range position #11-1 that does not overlap with range positions of other pieces of content information, as the range position at which the content information C111 is actually reproduced and output. In addition, a distance width indicating the range position #11-1 may correspond to the distance "250 m" through which the vehicle VE1 travels at "60 km/h", according to the reproduction time "15 seconds".

Furthermore, the determination unit 137 determines a range position indicating in which range of the geographical range #121 the content information C121 should be actually reproduced and output. According to the example of the pattern 1 in FIG. 6, the determination unit 137 is configured to determine a range position #12-1 that does not overlap with range positions of other pieces of content information, as the range position at which the content information C121 is actually reproduced and output. In addition, a distance width indicating range position #12-1 may correspond to the distance "250 m" through which the vehicle VE1 travels at "60 km/h", according to the reproduction time "15 seconds".

Furthermore, the determination unit 137 determines a range position indicating in which range of the geographical range #211 the content information C211 should be actually reproduced and output. According to the example of the pattern 1 in FIG. 6, the determination unit 137 is configured to determine a range position #21-1 that does not overlap with range positions of other pieces of content information, as the range position at which the content information C211 is actually reproduced and output. In addition, a distance width indicating range position #21-1 may correspond to the distance "500 m" through which the vehicle VE1 travels at "60 km/h", according to the reproduction time "30 seconds".

Furthermore, the determination unit 137 determines a range position indicating in which range of the geographical range #221 the content information C221 should be actually reproduced and output. According to the example of the pattern 1 in FIG. 6, the determination unit 137 is configured to determine a range position #22-1 that does not overlap with range positions of other pieces of content information, as the range position at which the content information C221 is actually reproduced and output. In addition, a distance width indicating range position #22-1 may correspond to the distance "500 m" through which the vehicle VE1 travels at "60 km/h", according to the reproduction time "30 seconds".

Next, the pattern 2 will be described with reference to FIG. 7. The pattern 2 shows an example in which the output order to sequentially reproduce and output the content information C111, C121, C211, and C221 without causing interference with each other is determined, on the basis of a distance through which the vehicle VE1 travels according to the reproduction time of each piece of content information and a relationship in overlapping of areas between the geographical ranges, in consideration of the priority between the content information C111, C121, C211, and C221. Note that the condition setting is similar to that of pattern 1 excepting consideration of the priority, and thus redundant description will be omitted.

For example, the prediction unit 134 predicts the travel condition of the vehicle VE1 at predetermined timing in the future, within the geographical ranges including the geographical ranges #111, #121, #211, and #221, on the basis of the travel information indicating the current travel condition (statistical travel information obtained from a history of the travel condition may be used). The calculation unit 136 calculates the priority of reproduction output for each piece of content information, on the basis of a result of such prediction.

Here, in the example of pattern 2 in FIG. 7, it is assumed that the calculation unit 136 calculates at least the priority of the content information C121 higher than that of the content information C221. As in the pattern 1, assuming that the content information C111 is reproduced and output within the geographical range #111, the content information C121 is reproduced and output within the geographical range #121, the content information C211 is reproduced and output within the geographical range #211, and the content information C221 is reproduced and output within the geographical range #221, according to the travel of the vehicle VE1, the determination unit 137 determines the output order to sequentially reproduce and output the respective pieces of content information without causing interference with each other, on the basis of the distance and the overlapping relationship.

However, at this time, unlike the example of the pattern 1, the determination unit 137 determines the overall output order so that the content information C121 is output earlier than the content information C221, as illustrated in FIG. 7. For example, the determination unit 137 is configured to determine the output order of the content information C121 (first)→C221 (second)→C111 (third)→C211 (fourth).

Next, the pattern 3 will be described with reference to FIG. 7. The pattern 3 also shows an example in which the output order is determined in consideration of the priority between the content information C111, C121, C211, and C221, but the priority is different from that in the example of the pattern 2.

Here, in the example of pattern 3 in FIG. 7, it is assumed that the calculation unit 136 calculates at least the priority of the content information C211 higher than that of the content information C111. As in the pattern 1, assuming that the content information C111 is reproduced and output within the geographical range #111, the content information C121 is reproduced and output within the geographical range #121, the content information C211 is reproduced and output within the geographical range #211, and the content information C221 is reproduced and output within the geographical range #221, according to the travel of the vehicle VE1, the determination unit 137 determines the output order to sequentially reproduce and output the respective pieces of content information without causing interference with each other, on the basis of the distance and the overlapping relationship.

However, at this time, unlike the example of the pattern 1, the determination unit 137 determines the overall output order so that the content information C211 is output earlier than the content information C111, as illustrated in FIG. 7. For example, the determination unit 137 is configured to determine the output order of the content information C221 (first)→C121 (second)→C211 (third)→C111 (fourth).

8. Modification of Information Processing According to Embodiment

Figure 8:
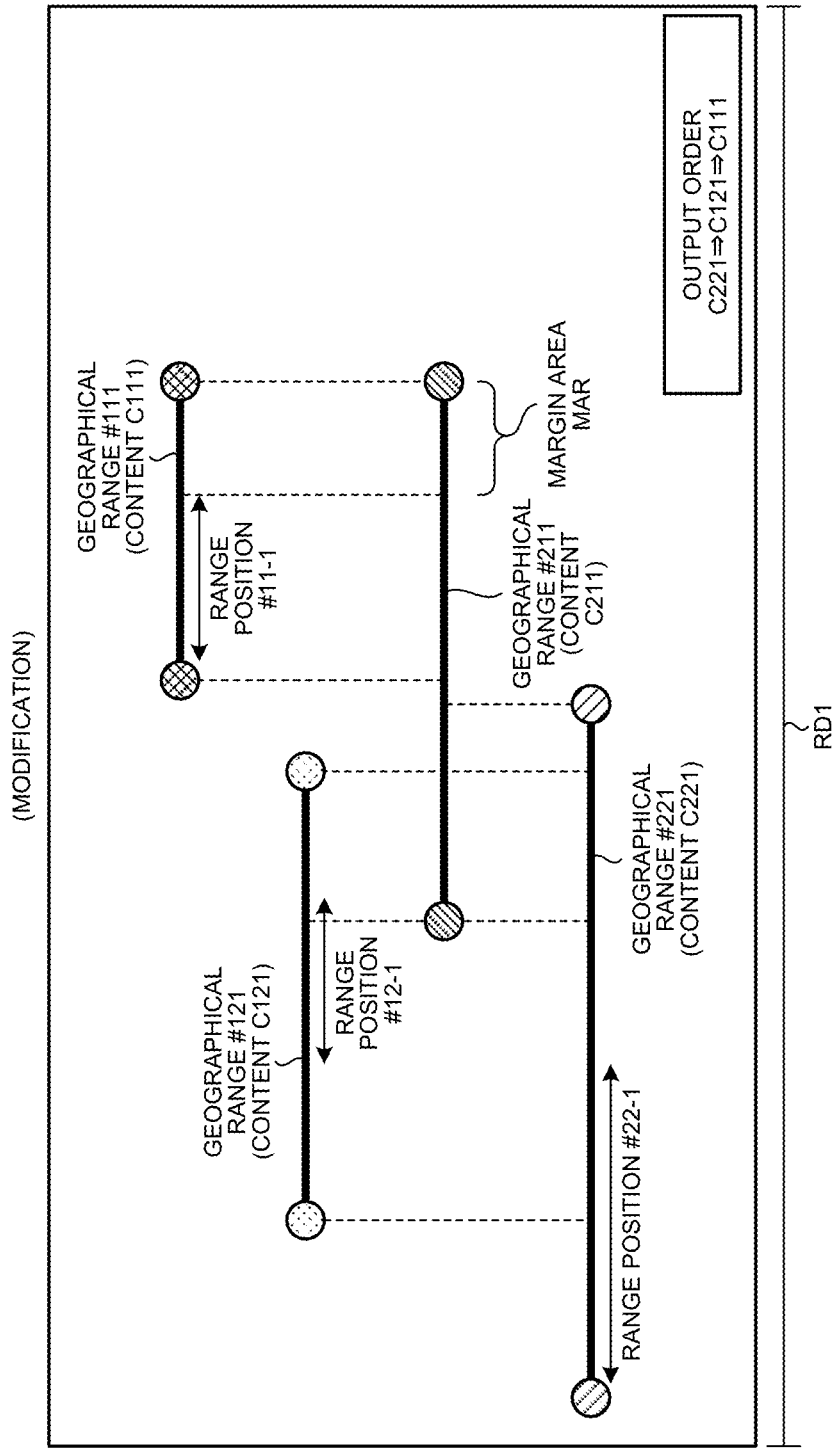
FIG. 8 is a diagram illustrating modification corresponding to the information processing according to an embodiment.

Next, processing performed by the information control unit 139 will be described as a modification of the contents illustrated in FIG. 6, with reference to FIG. 8. FIG. 8 is a diagram illustrating modification corresponding to the information processing according to an embodiment. In the example of FIG. 8, for convenience of illustration of the processing performed by the information control unit 139, the geographical range #211 corresponding to the content information C211 is narrower than that in FIG. 6.

For example, the determination unit 137 extracts a combination of pieces of content information in which the pieces of content information are allowed to be sequentially reproduced and output so as not to interfere with each other, on the basis of the relationship in overlapping of areas between the geographical ranges, and the distance through which the vehicle VE1 travels according to the reproduction time of each piece of content information. Then, the determination unit 137 determines a combination in alignment order according to the priority calculated by the calculation unit 136 from among the extracted combinations, as the output target content information, and determines the alignment order in the combination as the output order. According to the determination processing configured as described above, some content information may be excluded from the combination, that is, some content information may not be extracted as the output target, in some cases.

Here, FIG. 8 illustrates an example in which the content information C211 is excluded from among the content information C111, C121, C211, and C221. Furthermore, in this example, the content information C221, C121, and C111 are reproduced and output in this order, but at the time when the reproduction output of the content information C111 finally output in the output order is finished, it is estimated that there is room for leaving a margin area MAR in the geographical range #211 corresponding to the excluded content information C211. When it is estimated that the margin area MAR remains as described above, the information control unit 139 acquires the content information controlled within the reproduction time according to the margin area MAR as the additional content information to be reproduced and output in the margin area MAR.

For example, when a short version having the contents similar to those of the excluded content information C211 but having a shorter reproduction time is registered in advance in the storage unit, the information control unit 139 is allowed to acquire the content information C211 having this short version as the additional content information to be reproduced and output in the margin area MAR. Furthermore, in such a case, the output control unit 138 is allowed to reproduce and output the content information C211 having the short version, when the reproduction output of the content information C111 ends and the vehicle VE1 enters the margin area MAR.

Note that when it is estimated that the margin area MAR remains, the information control unit 139 may dynamically generate the short version having contents similar to those of the excluded content information C211 but having a shorter reproduction time. Furthermore, when it is estimated that the margin area MAR remains, the information control unit 139 may control the reproduction time of the content information C111, C121, C211, and C221 to be reduced relative to the current reproduction time so that all pieces of the content information C111, C121, C211, and C221 are reproduced and output. For example, the information control unit 139 may reduce the reproduction time of all pieces of content information C111, C121, C211, and C221, or may reduce the reproduction time of at least one of the pieces of content information C111, C121, C211, and C221.

9. Overall Processing Procedure

Next, a procedure of information processing according to an embodiment will be described with reference to FIG. 9.

Figure 9:
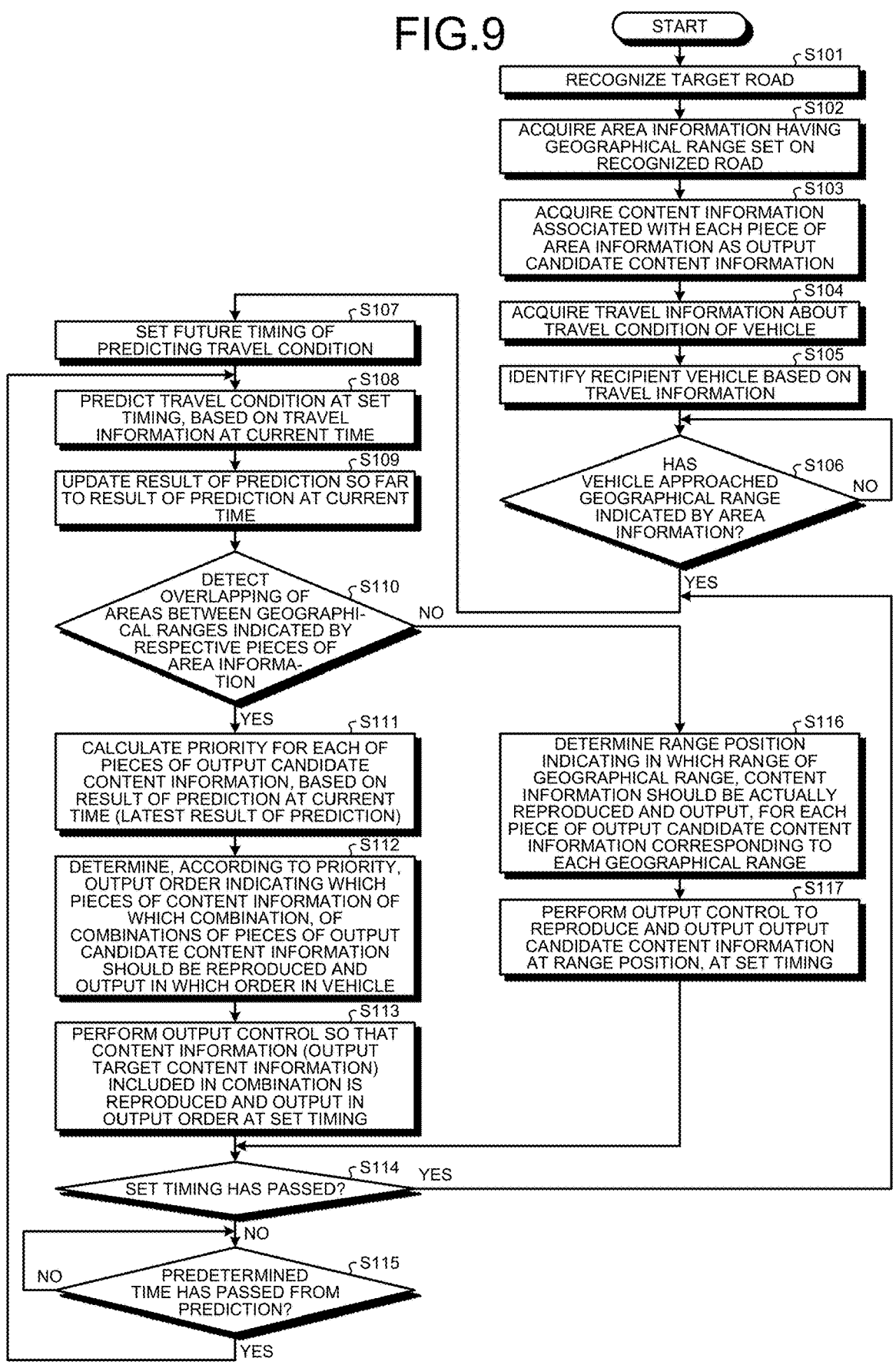
FIG. 9 is a flowchart illustrating an overall procedure of the information processing according to an embodiment.

FIG. 9 is a flowchart illustrating an overall procedure of the information processing according to an embodiment.

First, the second acquisition unit 132 recognizes which of a number of candidate roads is the target road (Step S101). Using the example of FIG. 6, it is assumed that the second acquisition unit 132 recognizes the road RD1, as the target road.

Next, the second acquisition unit 132 acquires a piece of area information having the geographical range set on the road RD1 recognized in Step S101, from among pieces of the area information input by the respective applications (Step S102). Similarly, using the example of FIG. 6, it is assumed that the second acquisition unit 132 acquires, as the area information having the geographical range set on the road RD1, the area information corresponding to the geographical range #111 set as the meta-information by the application AP11, the area information corresponding to the geographical range #121 set as the meta-information by the application AP12, the area information corresponding to the geographical range #211 set as the meta-information by the application AP21, and the area information corresponding to the geographical range #221 set as the meta-information by the application AP22.

Furthermore, the second acquisition unit 132 acquires content information associated with each piece of area information acquired in Step S102, as the output candidate content information (Step S103). According to the above example, the second acquisition unit 132 acquires the content information C111, C121, C211, and C221 as the output candidate content information.

In addition, the first acquisition unit 131 acquires the travel information about the travel condition of the vehicle (Step S104). For example, the first acquisition unit 131 acquires the travel information indicating the tracked travel condition, in response to tracking of the travel condition as needed by the condition tracking engine E30-1 (E30-2). For example, the first acquisition unit 131 may acquire the travel information indicating the travel condition of a vehicle traveling on the road RD1, a vehicle traveling in the vicinity of the road RD1, or a vehicle predicted to enter the road RD1 ahead.

Next, the identification unit 133 identifies a recipient vehicle to which the content information is distributed, on the basis of the travel information acquired in Step S104 (Step S105). For example, the identification unit 133 is configured to extract a vehicle traveling in a direction toward the target point, according to each of the pieces of content information C111, C121, C211, and C221, on the basis of the travel information, and identify the extracted vehicle as the recipient vehicle. In addition, the identification unit 133 is configured to extract a vehicle traveling in a lane on a side on which the target point according to each of the pieces of content information C111, C121, C211, and C221 is located, on the basis of the travel information, and identify the extracted vehicle as the recipient vehicle. In the example of FIG. 6, the identification unit 133 identifies the vehicle VE1 as the recipient vehicle, with respect to the target point Gi. As a matter of course, the identification unit 133 may identify a plurality of vehicles as the recipient vehicles, but here, for ease of description, it is assumed that the identification unit 133 identifies one vehicle VE1.

In such a state, the prediction unit 134 determines whether the vehicle VE1 has approached the geographical range indicated by the area information acquired in Step S102 (Step S106). For example, the prediction unit 134 determines whether the vehicle VE1 has approached the geographical range including the geographical ranges #111,

121, #211, and #221. While determining that the vehicle VE1 does not approach the geographical range (Step S106; No) the prediction unit 134 stands by until it can be determined that the vehicle VE1 has approached the geographical range.

On the other hand, when it can be determined that the vehicle VE1 has approached the geographical range (Step S106; Yes), the prediction unit 134 sets future timing of predicting the travel condition of the vehicle VE1 (Step S107). In other words, the prediction unit 134 determines at what timing in the future the travel condition of the vehicle VE1 should be predicted. As an example, the prediction unit 134 may set timing after a lapse of predetermined time from the current time (e.g., 30 seconds later), as the future timing, and in such a case, the prediction unit 134 performs prediction processing of predicting the travel condition of the vehicle VE1 at that timing. Hereinafter, the timing set in Step S107 is referred to as "set timing".

Next, the prediction unit 134 predicts the travel condition of the vehicle VE1 at the set timing, on the basis of the travel information at the current time by using a loop which is described later (Step S108).

Here, the prediction unit 134 repeats prediction processing of predicting the travel condition at the set timing with the lapse of time by using the loop which is described later. Therefore, when the travel condition at the set timing has been predicted from the travel information at that time before the current time, the prediction unit 134 updates the result of the prediction so far to a result of the prediction at the current time (result of the prediction by prediction in Step S108) (Step S109).

Next, the detection unit 135 detects overlapping of areas between the geographical ranges indicated by the respective pieces of area information (Step S110). Specifically, the detection unit 135 compares the geographical ranges #111, #121, #211, and #221 with each other to detect which areas of the geographical ranges #111, #121, #211, and #221 overlap how far.

Now, a process will be described when overlapping of areas is detected between the geographical ranges #111, #121, #211, and #221 (Step S110; Yes).

The calculation unit 136 calculates the priority of reproduction output for each of the pieces of output candidate content information (content information C111, C121, C211, and C221) on the basis of a result of the prediction at the current time (latest result of the prediction) predicted in Step S108 (Step S111).

For example, the calculation unit 136 may calculate a higher priority, for the content information indicating a facility to be advertised (e.g., store) located closer to the movement direction of the vehicle VE1 at the set timing. Furthermore, for example, the calculation unit 136 may calculate a higher priority, for the content information indicating a facility to be advertised located closer to a driving lane of the vehicle VE1 at the set timing. Furthermore, for example, the calculation unit 136 may calculate a higher priority, for the content information indicating a facility to be advertised located closer to the position of the vehicle VE1 at the set timing. Thus, the calculation unit 136 is allowed to calculate a higher priority for the content information of the content information C111, C121, C211, and C221 having higher relevance to the result of the prediction by the prediction unit 134.

Next, according to the priority calculated in Step S111, the determination unit 137 determines the output order indicating which pieces of content information of which combination, from among combinations of pieces of the output candidate content information (content information C111, C121, C211, and C221), should be reproduced and output in which order in the vehicle (Step S112). For example, the determination unit 137 extracts a combination of pieces of content information in which the pieces of content information are allowed to be sequentially reproduced and output so as not to interfere with each other, on the basis of a relationship in overlapping of areas detected in Step S111 and the distance through which the vehicle VE1 travels according to the reproduction time of each piece of content information. Then, the determination unit 137 determines a combination in an alignment order according to the priority calculated by the calculation unit 136 from among the extracted combinations, as the output target content information, and determines the alignment order in the combination as the output order.

Furthermore, in Step S112, the determination unit 137 may also determine a range position indicating in which range of the geographical range corresponding to the content information the content information should be actually reproduced and output, for each piece of output target content information.

Next, the output control unit 138 performs output control so that content information (output target content information) included in the combination is reproduced and output in the output order determined in Step S112 at the set timing (Step S113). For example, the output control unit 138 performs output control for the terminal device 10 to reproduce and output the output target content information in the output order according to the priority determined by the determination unit 137 and at the range position.

Here, the prediction unit 134 determines whether the set timing set in Step S107 has passed (Step S114). When it is determined that the set timing has passed (Step S114; Yes), the prediction unit 134 proceeds to Step S107, and sets the next new timing, repeating the processing after Step S107.

On the other hand, when it is determined that the set timing has not passed (Step S114; No), the prediction unit 134 determines whether a predetermined time has elapsed from a time point at which the prediction is performed in Step S108 (Step S115). For example, the prediction unit 134 determines whether five seconds have elapsed from the time point at which the prediction is performed in Step S108.

While determining that the predetermined time has not elapsed from the time point at which the prediction is performed in Step S108 (Step S115; No), the prediction unit 134 stands by until it can be determined that the predetermined time has elapsed. On the other hand, when it is determined that the predetermined time has elapsed (Step S115; Yes), the prediction unit 134 returns to Step S108.

Subsequently, a process will be described when no overlapping of areas is detected between the geographical ranges #111, #121, #211, and #221 (Step S110; No).

In this example, the determination unit 137 determines the range position indicating in which range of the geographical range corresponding to the content information, the content information should be actually reproduced and output, for each of the pieces of output candidate content information (content information C111, C121, C211, and C221) (Step S116).

The output control unit 138 performs output control for the terminal device 10 to reproduce and output each piece of the output candidate content information at the range position determined in Step S116 at the set timing (Step S117).

10. Determination Processing Procedure

Figure 10:
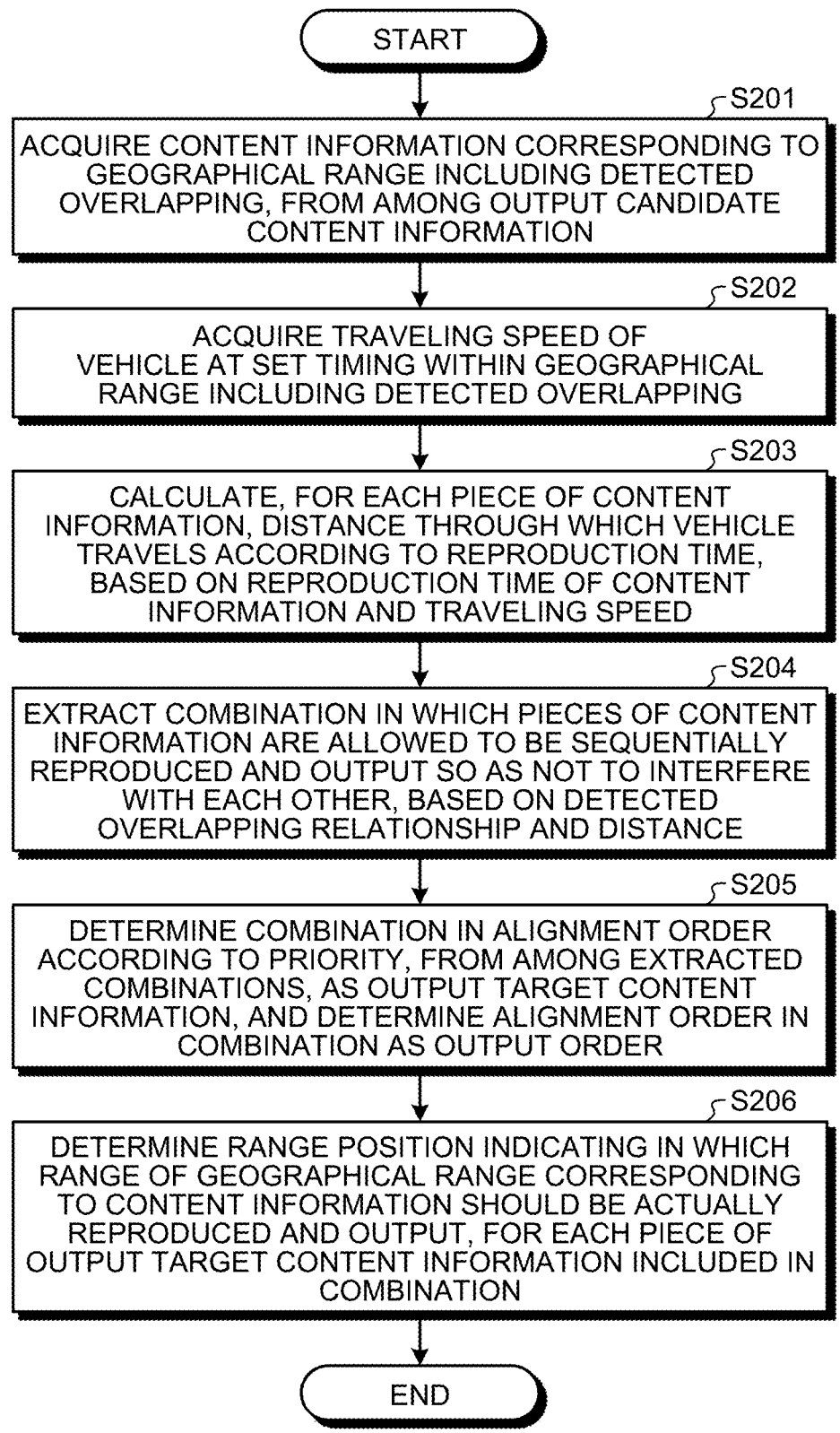
FIG. 10 is a flowchart illustrating a determination processing procedure included in the procedure of the information processing according to an embodiment.

Subsequently, focusing on the determination processing performed in Step S112 in FIG. 9, a processing procedure of the determination processing will be described with reference to FIG. 10. FIG. 10 is a flowchart illustrating the determination processing procedure included in the procedure of the information processing according to an embodiment.

For example, the determination unit 137 acquires content information corresponding to the geographical range including the overlapping detected in Step S110, from among the output candidate content information (content information C111, C121, C211, and C221) (Step S201).

In addition, the determination unit 137 acquires the traveling speed of the vehicle VE1 at the set timing, within the geographical range including the overlapping detected in Step S110, from among the traveling speeds (example of the travel condition) predicted by the prediction unit 134 (Step S202).

Then, for each piece of output candidate content information, the determination unit 137 calculates the distance through which the vehicle travels according to the reproduction time, on the basis of the reproduction time of the content information and the traveling speed acquired in Step S202 (Step S203).

Next, the determination unit 137 extracts a combination of pieces of output candidate content information in which the pieces of output candidate content information are allowed to be sequentially reproduced and output so as not to interfere with each other, on the basis of a relationship in overlapping detected in Step S110, and the distance (Step S204).

Then, the determination unit 137 determines a combination in alignment order according to the priority, from among the extracted combinations, as the output target content information, and determines the alignment order in the combination as the output order (Step S205).

Furthermore, the determination unit 137 determines the range position indicating in which range of the geographical range corresponding to the content information the content information should be actually reproduced and output, for each piece of output target content included in the combination extracted in Step S204 (Step S206).

11. Conclusion

The information processing apparatus 100 according to an embodiment acquires the area information that corresponds to each of the plurality of pieces of content information and that indicates the geographical range in which the content information is to be reproduced and output. Then, the information processing apparatus 100 determines the output order in reproducing and outputting the plurality of pieces of content information in the vehicle, on the basis of the reproduction time of each of the plurality of pieces of content information and the area information. According to the information processing apparatus 100 configured as described above, it is possible to sequentially reproduce and output the respective pieces of content information associated with the geographical ranges to be reproduced and output, from the vehicle without interfering with each other within the geographical ranges.

Furthermore, the information processing apparatus 100 according to an embodiment acquires the travel information about the travel condition of the vehicle, and also acquires the area information that corresponds to each of the plurality of pieces of content information and that indicates the geographical range in which the content information is to be reproduced and output. Then, the information processing apparatus 100 determines the output order in reproducing and outputting the plurality of pieces of content information in the vehicle, on the basis of the travel information and the area information. According to the information processing apparatus 100 configured as described above, it is possible to sequentially reproduce and output the respective pieces of content information associated with the geographical ranges to be reproduced and output, from the vehicle without interfering with each other within the geographical ranges.

Furthermore, the information processing apparatus 100 according to an embodiment acquires the travel information about the travel condition of the vehicle, and also acquires the area information that corresponds to each of the plurality of pieces of content information and that indicates the geographical range in which the content information is to be reproduced and output. Then, the information processing apparatus 100 predicts the travel condition of the vehicle within the geographical range on the basis of the travel information, and calculates the priority of the reproduction output for each of the plurality of pieces of content information on the basis of a result of the prediction. Then, the information processing apparatus 100 determines the output order in reproducing and outputting the plurality of pieces of content information in the vehicle, according to the calculated priority. According to the information processing apparatus 100 configured as described above, predicting the travel condition of the vehicle makes it possible to optimize the reproduction output of the content information according to the change in travel condition.

12. Hardware Configuration

Figure 11:
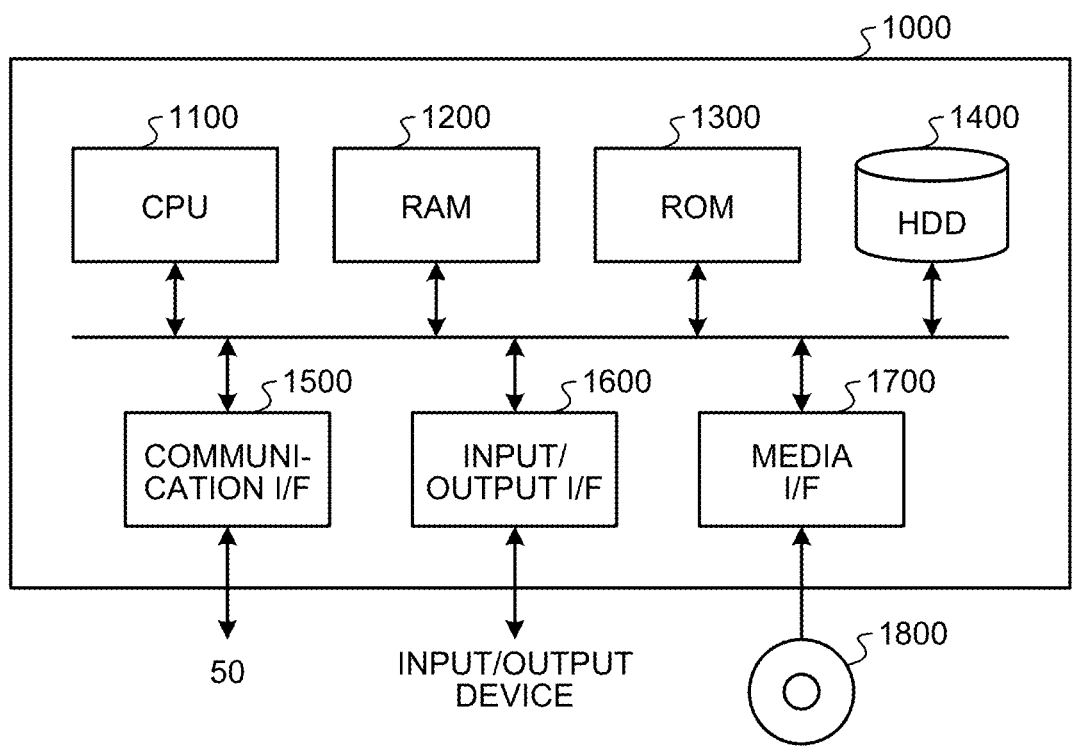
FIG. 11 is a hardware configuration diagram illustrating an example of a computer implementing the functions of the information processing apparatus.

Furthermore, the information processing apparatus 100 according to the embodiment described above is implemented by, for example, a computer 1000 having a configuration as illustrated in FIG. 11. FIG. 11 is a hardware configuration diagram illustrating an example of the computer implementing the functions of the information processing apparatus 100. The computer 1000 includes CPU 1100, RAM 1200, ROM 1300, HDD 1400, a communication interface (I/F) 1500, an input/output interface (I/F) 1600, and a media interface (I/F) 1700.

The CPU 1100 operates on the basis of a program stored in the ROM 1300 or the HDD 1400, and controls each of the units. The ROM 1300 stores a boot program that is executed by the CPU 1100 when the computer 1000 is activated, a program depending on hardware of the computer 1000, and the like.

The HDD 1400 stores a program executed by the CPU 1100, data used by the program, and the like. The communication interface 1500 receives data from another device via a predetermined communication network, transmits the data to the CPU 1100, and transmits data generated by the CPU 1100 to another device via the predetermined communication network.

The CPU 1100 controls an output device such as a display or printer and an input device such as a keyboard or mouse, via the input/output interface 1600. The CPU 1100 acquires data from the input device via the input/output interface 1600. In addition, the CPU 1100 outputs generated data to the output device via the input/output interface 1600.

The media interface 1700 reads a program or data stored in a recording medium 1800 and provides the program or data to the CPU 1100 via the RAM 1200. The CPU 1100 loads the program from the recording medium 1800 onto the RAM 1200 via the media interface 1700, and executes the loaded program. The recording medium 1800 is, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, when the computer 1000 functions as the information processing apparatus 100 according to the embodiment, the CPU 1100 of the computer 1000 executes the programs loaded on the RAM 1200 to implement the function of the control unit 130. The CPU 1100 of the computer 1000 reads and executes these programs from the recording medium 1800, but in another example, these programs may be acquired from another device via the predetermined communication network.

13. Others

Among the processing described in the above embodiments, all or some of the processing steps described as being performed automatically can be performed manually, or all or some of the processing steps described as being performed manually can be performed automatically by using a known method. In addition, the processing procedures, specific names, and information including various data and parameters described or illustrated can be appropriately changed unless otherwise specified. For example, the various information illustrated in the drawings is not limited to the illustrated information.

In addition, the components of the respective devices are functionally conceptually illustrated, but are not necessarily physically configured as illustrated. In other words, specific forms of separation and integration of the devices are not limited to those in the drawings, and all or part thereof can be functionally or physically separated and integrated in appropriate units according to various loads, usage conditions, and the like.

In addition, the embodiments described above can be appropriately combined within a range consistent with the contents of processing.

While the embodiments of the present application have been described in detail with reference to the drawings, these are merely examples, and the present invention can be implemented in other modes for which various modifications and improvements are made on the basis of the knowledge of those skilled in the art, including the aspects described in disclosure of the invention.

In addition, wording "portion (section, module, unit)" described above can be replaced with "means", "circuit", or the like. For example, the determination unit can be replaced with a determination means or a determination circuit.

REFERENCE SIGNS LIST

Sy INFORMATION PROCESSING SYSTEM
100 INFORMATION PROCESSING APPARATUS
120 STORAGE UNIT
121 CONTENT DATABASE
122 TRAVEL INFORMATION DATABASE
130 CONTROL UNIT
131 FIRST ACQUISITION UNIT
132 SECOND ACQUISITION UNIT
133 IDENTIFICATION UNIT
134 PREDICTION UNIT
135 DETECTION UNIT
136 CALCULATION UNIT
137 DETERMINATION UNIT
138 OUTPUT CONTROL UNIT
139 INFORMATION CONTROL UNIT

The invention claimed is:

1. An information processing apparatus comprising one or more memory devices having a program stored therein that, when executed by a processor, causes the processor to:
    acquire movement information about a moving condition of a mobile object;
    acquire a plurality of pieces of content information provided from a plurality of applications, respectively, each of the plurality of pieces of content information associated with range information indicating a geographical range in which the content information is permitted to be reproduced and output;
    predict the moving condition of the mobile object within the geographical range based on the movement information;
    calculate priority of reproduction output for each of the plurality of pieces of content information based on a relevance between a result of the prediction and each of the plurality of pieces of content information; and
    determine an output order of the plurality of pieces of content information in reproducing and outputting in the mobile object, the plurality of pieces of content information being arranged according to the priority of the each of the plurality of pieces of content information.

2. The information processing apparatus according to claim 1, wherein the processor is configured to acquire range information indicating a geographical range in which the content information is to be reproduced and output from beginning to end.

3. The information processing apparatus according to claim 1, wherein the processor is configured to:
    repeat, with a lapse of time, prediction of a moving condition of the mobile object within the geographical range, the moving condition being a moving condition at predetermined timing in the future to update a result of the prediction,
    calculate priority of reproduction output for each of the plurality of pieces of content information, based on a latest result of the prediction, from among results of the prediction predicted with the lapse of time, and
    determine an output order to sequentially reproduce and output the plurality of pieces of content information arranged according to the priority of the each of the plurality of pieces of content information without causing interference with each other, at the predetermined timing.

4. The information processing apparatus according to claim 3, wherein the movement information includes direction information indicating a movement direction of the mobile object, and the processor is configured to:
    repeat, with the lapse of time, prediction of the movement direction of the mobile object at the predetermined timing, based on the direction information to update a result of the prediction of the movement direction, and
    calculate the priority of reproduction output for each of the plurality of pieces of content information, based on the latest result of the prediction, from among results of the predictions of the movement direction.

5. The information processing apparatus according to claim 3, wherein the movement information includes lane information indicating a traveling lane of the mobile object, and the processor is configured to:
    repeat, with the lapse of time, prediction of the traveling lane of the mobile object at the predetermined timing, based on the lane information to update a result of the prediction of the traveling lane, and calculate the priority of reproduction output for each of the plurality of pieces of content information, based on the latest result of the prediction, from among results of the prediction of the traveling lane.

6. The information processing apparatus according to claim 3, wherein the movement information includes speed information about a speed of the mobile object, and the processor is configured to:
repeat, with the lapse of time, position prediction of the mobile object at the predetermined timing, based on the speed information to update a result of the prediction of the position, and
calculate priority of reproduction output for each of the plurality of pieces of content information, based on the latest result of the prediction, from among results of the prediction of the position.

7. The information processing apparatus according to claim 3, wherein the movement information includes congestion information about the mobile object, and the processor is configured to:
repeat, with the lapse of time, position prediction of the mobile object at the predetermined timing, based on the congestion information to update a result of the prediction of the position, and
calculate priority of reproduction output for each of the plurality of pieces of content information, based on the latest result of the prediction, from among results of the prediction of the position.

8. The information processing apparatus according to claim 1, wherein the processor is configured to
calculate a higher priority, for the content information more relevant to the result of the prediction of the plurality of pieces of content information.

9. The information processing apparatus according to claim 1, wherein the processor is configured to:
detect overlapping of areas between geographical ranges indicated by the respective pieces of range information; and
in response to detecting the overlapping, determine the output order, based on a relationship of the detected overlapping and a moving condition predicted.

10. An information processing method executed by an information processing apparatus, the information processing method comprising:
acquiring movement information about a moving condition of a mobile object;
acquiring range information that is a plurality of pieces of content information provided from a plurality of applications, respectively, each of the plurality of pieces of content information associated with the range information indicating a geographical range in which the content information is permitted to be reproduced and output;
predicting the moving condition of the mobile object within the geographical range based on the movement information;
calculating priority of reproduction output for each of the plurality of pieces of content information based on a relevance between a result of the prediction by the predicting and each of the plurality of pieces of content information; and
determining an output order of the plurality of pieces of content information in reproducing and outputting in the mobile object, the plurality of pieces of content information being arranged according to the priority of the each of the plurality of pieces of content information calculated by the calculating.

11. A non-transitory computer-readable storage medium having stored therein an information processing program executed by an information processing apparatus including a computer, the information processing program causing the computer to function to perform:
acquiring movement information about a moving condition of a mobile object;
acquiring range information that is a plurality of pieces of content information provided from a plurality of applications, respectively, each of the plurality of pieces of content information associated with the range information indicating a geographical range in which the content information is permitted to be reproduced and output;
predicting the moving condition of the mobile object within the geographical range based on the movement information;
calculating priority of reproduction output for each of the plurality of pieces of content information based on a relevance between a result of the prediction by the predicting and each of the plurality of pieces of content information; and
determining an output order of the plurality of pieces of content information in reproducing and outputting in the mobile object, the plurality of pieces of content information being arranged according to the priority of the each of the plurality of pieces of content information calculated by the calculating.

* * * * *